(12) United States Patent
Herre et al.

(10) Patent No.: US 8,794,174 B2
(45) Date of Patent: Aug. 5, 2014

(54) COATING INSTALLATION AND ASSOCIATED OPERATING METHOD

(75) Inventors: Frank Herre, Oberriexingen (DE); Uwe Siewert, Freiberg (DE); Guenther Weihermueller, Pleidelsheim (DE)

(73) Assignee: Durr Systems GmbH, Bietigheim Bissingen (DE)

( * ) Notice: Subject to any disclaimer, the term of this patent is extended or adjusted under 35 U.S.C. 154(b) by 1265 days.

(21) Appl. No.: 12/064,122

(22) PCT Filed: May 7, 2007

(86) PCT No.: PCT/EP2007/004017
§ 371 (c)(1),
(2), (4) Date: Jul. 28, 2008

(87) PCT Pub. No.: WO2007/131660
PCT Pub. Date: Nov. 22, 2007

(65) Prior Publication Data
US 2009/0117283 A1    May 7, 2009

(30) Foreign Application Priority Data

May 12, 2006  (DE) .......................... 10 2006 022 335
Sep. 27, 2006  (DE) .......................... 10 2006 045 642

(51) Int. Cl.
| | | |
|---|---|---|
| *B05C 11/00* | (2006.01) | |
| *B05C 5/00* | (2006.01) | |
| *B05D 1/02* | (2006.01) | |
| *B65G 47/10* | (2006.01) | |
| *B65G 1/00* | (2006.01) | |
| *B65G 47/68* | (2006.01) | |
| *B05B 13/02* | (2006.01) | |
| *B05B 15/12* | (2006.01) | |
| *B25J 9/00* | (2006.01) | |
| *B05D 3/02* | (2006.01) | |

(52) U.S. Cl.
CPC ......... *B05B 13/0221* (2013.01); *B05B 15/1207* (2013.01); *B25J 9/0093* (2013.01); *B05D 3/02* (2013.01); *B05C 11/00* (2013.01); *Y10S 901/43* (2013.01)
USPC ............... 118/66; 118/67; 118/300; 118/324; 118/643; 118/58; 427/424; 700/248; 198/348; 198/465.2; 198/347.3; 198/436; 901/43

(58) Field of Classification Search
None
See application file for complete search history.

(56) References Cited

U.S. PATENT DOCUMENTS 3,952,699 A    4/1976  Durr et al.
5,664,323 A  *  9/1997  Ishida et al. .................... 29/822

(Continued)

FOREIGN PATENT DOCUMENTS

DE      23 06 851 A1     3/1975
DE      39 27 880 A1     1/1991

(Continued)

OTHER PUBLICATIONS

PCT International Search Report for PCT/EP2007/004017, 5 pages.

(Continued)

*Primary Examiner* — Dah-Wei D Yuan
*Assistant Examiner* — Binu Thomas
(74) *Attorney, Agent, or Firm* — Bejin VanOphem and Bieneman PLC

(57) ABSTRACT

The invention relates to a coating installation, in particular for painting motor vehicle bodies, comprising a transport path (2, 12), along which a plurality of coating objects (1) are transported one after the other through the coating installation, and a plurality of treatment stations (13-17, 18-22, 23-27), in which the coating objects (1) are treated. It is proposed that the transport path (2, 12) branches into a plurality of parallel branches (5-9), in each of which at least one of the treatment stations (13-17, 18-22, 23-27) is arranged.

14 Claims, 16 Drawing Sheets

(56) References Cited

U.S. PATENT DOCUMENTS

Figure 1:
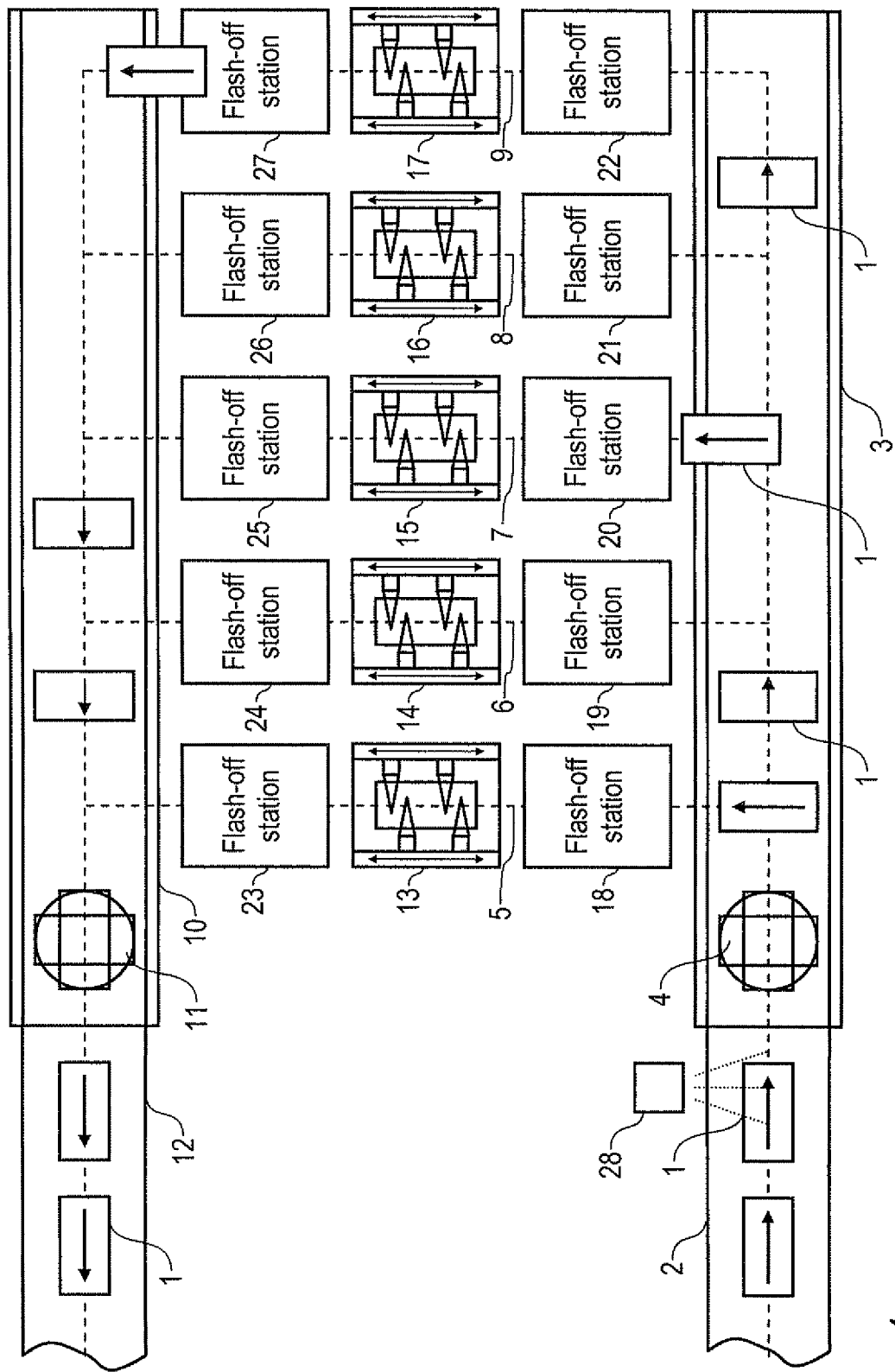

| | | | |
|---|---|---|---|
| 5,681,619 A * | 10/1997 | Ogasawara | 118/66 |
| 5,725,669 A | 3/1998 | Heckmann | |
| 5,743,962 A | 4/1998 | Ogasawara et al. | |
| 5,908,668 A | 6/1999 | Bulow et al. | |
| 6,374,589 B1 * | 4/2002 | Kunert et al. | 59/78.1 |
| 6,662,083 B2 * | 12/2003 | Angel | 700/248 |
| 2006/0000933 A1 * | 1/2006 | Duerr et al. | 239/701 |
| 2008/0020135 A1 * | 1/2008 | Fouvet | 118/308 |

FOREIGN PATENT DOCUMENTS

| | | |
|---|---|---|
| DE | 41 15 111 A1 | 11/1991 |
| DE | 697 11 089 T2 | 11/2002 |
| DE | 103 55 562 A1 | 6/2005 |
| EP | 0 842 706 A2 | 5/1998 |
| EP | 1369182 | 12/2003 |
| GB | 2450052 | 12/2008 |
| JP | 58 223458 A | 12/1983 |
| JP | 04227885 A | 8/1992 |
| JP | 2003144992 A | 5/2003 |
| JP | 2007283155 | 11/2007 |
| JP | 2007283156 | 11/2007 |
| RU | 2011429 C1 | 4/1994 |
| RU | 2116234 C1 | 7/1998 |
| WO | WO-2005/061128 A1 | 7/2005 |
| WO | 2007119863 | 10/2007 |

OTHER PUBLICATIONS

Svejda: "Prozesse and Applikationsverfahren in der Industriellen Lackiertechnik" Vincentz Verlag 2003, ISBN 3-87870-741-X, and Abstract.

* cited by examiner

COATING INSTALLATION AND ASSOCIATED OPERATING METHOD

CROSS-REFERENCE TO RELATED APPLICATIONS

This application is a National Phase application claiming the benefit of International Application No. PCT/EP 2007/004017, filed May 7, 2007, which claims priority to German Patent Application No. 10 2006 022 335.7, filed May 12, 2006, and German Patent Application No. 10 2006 045 642.4 filed Sep. 27, 2006, the complete disclosures of which are hereby incorporated in full.

The invention relates to a coating installation, in particular for painting motor vehicle bodies, and to a corresponding operating method according to the independent claims.

Modern painting installations for the series-painting of components, such as motor vehicle bodies and ancillary parts for example, usually comprise one or more painting lines in which the individual painting or treatment steps are carried out one after the other. To this end, the components to be painted are transported along a linear transport path through the painting installation and the individual treatment stations. Such painting installations usually operate in the "line tracking" mode, in which the components to be painted are transported continuously along the painting line and the transport path through the individual treatment stations. However, such painting installations are also known which operate in the "stop and go" mode, in which the components to be painted are transported in stages along the painting line. In both cases, the belt speed and the spacing between the successive components define the capacity of the painting installation.

The desired capacity of the painting installation also determines the number of atomizers required for this and hence also the number of painting robots or machines required. The number of painting robots or machines required in turn influences the length of the individual painting zones and thus also the length of the painting lines as a whole.

As the belt speed and cycle time increase, accordingly a greater number of painting robots must be used in order to achieve the necessary painting result. However, an increase in the number of painting robots means that the amount of active painting time decreases, as a result of which the effectiveness of the individual painting robots is reduced. For instance, the ratio of active use time to unused time (dead time) of the individual painting robots becomes increasingly worse as the belt speed and cycle time increase. Furthermore, an increase in the number of painting robots and thus also atomizers leads to greater paint losses each time the color or the component to be coated is changed, which is associated with a further reduction in efficiency.

Another disadvantage of the painting installations operating in the stop-and-go mode is the fact that the cycle time of the painting line as a whole must be adapted to the model of motor vehicle with the greatest painting complexity. If, for example, both luxury limousines with a high painting complexity and simple cars with a low painting complexity are to be painted in a single painting line, the luxury limousines limit the maximum possible cycle time due to their high painting complexity, as a result of which the entire painting process is slowed down.

Another problem with the known painting installations described above is the separate paint supply, since all tapping points have to be connected, which is complicated and expensive.

The object of the invention is therefore to provide a suitably improved painting installation.

This object is achieved by a coating installation according to the invention and a corresponding operating method, according to the independent claims.

The invention encompasses the general technical teaching of branching the linear transport path passing through the coating installation into a plurality of parallel branches, in each of which at least one of the treatment stations is arranged.

The term "treatment station" used in the context of the invention is to be understood in a general sense and relates for example to painting stations or booths in which the coating objects (e.g. motor vehicle bodies) are coated with a coating agent, such as filler, base coat or clear coat for example. Furthermore, the term "treatment station" used in the context of the invention also relates to drying stations in which the coating objects dry after a coating process, which drying may take place for example by irradiation or by means of a plasma furnace. Furthermore, the term "treatment station" also encompasses those treatment stations in which the coating objects are cleaned, degreased, rinsed, phosphatized, passivated, masked, unmasked, checked or repaired or in which a seam is sealed.

The term "coating object" used in the context of the invention is likewise to be understood in a general sense and is not limited to motor vehicle bodies, parts of motor vehicle bodies or ancillary parts therefor. Rather, the invention is also suitable for the coating of other coating objects, which are known from the prior art and therefore need not be described in any greater detail here.

Furthermore, the term "parallel branches of the transport path" used in the context of the invention is not limited to the precise geometric meaning in which the individual branches are oriented parallel to one another in the geometric sense. Rather, this term means only that parallel processing of the coating objects in the individual branches of the transport path is possible.

The individual branches of the transport path can therefore also branch substantially radially for example from a central branching point of the transport path. In this case, it is possible on the one hand that the coating objects are fed via the central branching point and then are distributed between the individual radial branches of the transport path. However, it is also possible as an alternative that the coating objects pass via the individual radial branches of the transport path to the branching point and then are conveyed further from there. Here, any number of processing stations may be arranged in each of the individual radial branches of the transport path, such as 3 or 8 processing stations for example.

In one preferred example of embodiment of the invention, a switch is arranged at the entrance-side branching point of the transport path, via which switch the coating objects can be fed in a targeted manner to one of the parallel branches. This advantageously allows distribution of the individual coating objects between the different branches.

Preferably, the parallel branches of the transport path are combined again at the exit side to form a single transport path, on which all the coating objects which were previously treated in the different parallel branches of the transport path can then be transported.

Furthermore, preferably at least one coating station, in which the coating objects are coated with a coating agent, is arranged in each of the parallel branches of the transport path. As a result, the flexibility of the coating installation as a whole is advantageously increased, since for example motor vehicle bodies with a high painting complexity can be painted in one branch, whereas motor vehicle bodies with a low painting complexity are painted in another branch of the transport path. In this case, the relatively long processing time for the motor vehicle bodies with the high painting complexity does not slow down the entire painting process, since the motor vehicle bodies with the lower painting complexity can be painted at an independent cycle time or belt speed.

Furthermore, a plurality of treatment stations may be arranged one behind the other in each of the parallel branches of the transport path, such as a painting station and one or more flash-off stations for example.

In one variant, in this case the same number of treatment stations is arranged in each of the parallel branches of the transport path. This is useful if essentially the same painting processes are carried out in the parallel paths, said painting processes differing only by the color used in each case.

In another variant, however, a different number of treatment stations is arranged in the parallel branches of the transport path. This is useful if different painting processes are to be carried out in the different branches, which painting processes accordingly require a different number of treatment stations.

In one example of embodiment of a coating installation according to the invention, an entry-side flash-off station, an exit-side flash-off station and a coating station arranged therebetween are located in at least one of the parallel branches of the transport path, arranged one behind the other in the transport direction.

During operation of this coating installation, two coating objects are transported one behind the other in the relevant branch of the transport path, so that the exit-side coating object is located in the central coating station while the entrance-side coating object is located in the entrance-side flash-off station. The coating object located in the coating station is then coated with a coating agent.

After the end of this coating process, the two coating objects are then jointly transported by one treatment station in the direction of the exit, so that the previously coated coating object is located in the exit-side flash-off station while the coating object previously located in a waiting position in the entrance-side flash-off station is now transported into the central coating station. The second coating object is then also coated with a coating agent in the coating station, while the previously coated coating object dries in the exit-side flash-off station.

After the end of this second coating process, the two coating objects are transported back by one treatment station so that the first coating object is again located in the coating station while the coating object previously coated in the central coating station is now located in the entrance-side flash-off station. In this position, the second coating object dries in the entrance-side flash-off station while the first coating object is again coated with a coating agent in the central coating station.

After the end of this coating process, the two coating objects are then again jointly transported by one treatment station in the direction of the exit, so that the first coating object is located in the exit-side flash-off station while the coating object previously dried in the entrance-side flash-off station is transported into the central coating station. The second coating object is then also coated for the second time, while the first coating object dries in the exit-side flash-off station.

In this way, therefore, in each case two coating objects can alternately be coated and dried in each branch of the transport path, which ensures a high efficiency of the coating installation. The transport path therefore allows bidirectional transport of the coating objects at least in one of the parallel branches.

Furthermore, it should be mentioned that the transport path may optionally implement a continuous mode, also known as "line tracking", or an intermittent transport mode, also known as "stop-and-go", which is known from the prior art and therefore need not be described in further detail here.

It is also possible within the scope of the invention that the transport path transports the individual coating objects at a uniform transport speed or at different transport speeds, as a result of which the flexibility of the coating installation according to the invention is considerably increased. By way of example, the transport speeds in the parallel branches of the transport path may be independent of one another, so that complicated coating objects are transported at a low transport speed in one branch while simple coating objects are transported at a high transport speed in another branch of the transport path. Furthermore, it is also possible that the transport speeds of the individual coating objects are completely independent of one another, which applies both within a branch or before the branching. In this way, it is possible for example that the transport speed in a single transport path for the different coating objects is varied in order to close or open up gaps between successive coating objects. Moreover, the cycle time or transport speed may also be adapted to the painting complexity of the respective coating object. Furthermore, the cycle time or transport speed may also be varied as a function of the model, type of paint, shade, paint manufacturer, desired painting quality and certain quality features. The invention therefore allows optimal utilization of the cycle time for each process step, as a result of which the capacity of the painting installation can be increased.

In one preferred example of embodiment of the invention, it is furthermore provided that, between two adjacent parallel branches of the transport path, there is at least one robot which operates the treatment stations in the two adjacent branches. As a result, on the one hand the number of robots required can be reduced, since one robot operates not just a single treatment station but rather the two adjacent treatment stations in the two adjacent parallel branches. On the other hand, the effectiveness of the individual robots is thus increased, since the ratio of active use time to inactive dead time is improved.

It is also possible within the scope of the invention that different coating stations are arranged in the different parallel branches of the transport path, as will be described below.

By way of example, a wet coat coating station may be arranged in one branch of the transport path while a powder coat coating station is arranged in another branch of the transport path. In this way, both a wet coat and a powder coat can be applied in a single painting line.

Furthermore, it is possible in this case that a monochromatic coating station, which applies only coating agents of the most frequently desired color ("high runner") without any color change, is arranged in one branch of the transport path, while a multichromatic coating station, which applies coating agents of different colors, is arranged in another branch of the transport path. The monochromatic coating station can then apply the most frequently desired color without any losses or delays due to color changes, wherein the most frequently desired color at present is silver in Europe and white in Asia. Nevertheless, the same painting line still allows the application of other colors in the other branches of the transport path.

Furthermore, within the scope of the invention, it is possible that an active coating station for normal operation is arranged in one branch of the transport path, while an inactive coating station for reserve operation is arranged in another branch of the transport path. The coating station provided for reserve operation makes it possible, for example in the event of failure of an active coating station, to maintain the painting capacity of the coating installation as a whole by using the inactive coating station in place of the failed coating station. Furthermore, the inactive coating station can also be used for paint trials under series production conditions, in order to test new paints and paint systems. Another possibility for use of the inactive coating station consists in using it as a so-called teaching booth, in which robots can be reprogrammed. It is also possible to optimize painting programs in the inactive coating station over a relatively long period of time of several years, in order then to transfer the optimized painting programs to the other coating stations.

Furthermore, it is possible within the scope of the invention that a coating station for motor vehicle bodies is arranged in one branch of the transport path, while a coating station for ancillary parts (e.g. bumpers) is arranged in another branch of the transport path. This advantageously allows optimization of the individual coating stations with regard to the requirements of the respective coating objects.

In another variant of the invention, a monochromatic coating station, which in each case applies only coating agents of one specific color, is arranged in each of the individual branches of the transport path, wherein a monochromatic recycling device, which reuses only the coating agent from the associated coating station, is arranged in each of these monochromatic coating stations. On the one hand, this monochromatic recycling offers the advantage that the coating agent obtained is particularly suitable for reuse due to its monochromatic composition. On the other hand, despite the monochromatic coating stations, the application of different colors is still possible by distributing the coating objects between the different branches of the transport path in which the coating stations with the desired colors are located.

In one example of embodiment of the invention, at least one coating station has two clear coat painting robots and two base coat painting robots, which can also be used as handling robots. During the application of base coat, the clear coat painting robot is not required for the application of paint and then serves as a handling robot in order for example to open doors or hoods of a motor vehicle body. During the application of the clear coat on the other hand, the base coat painting robot is not required and can then be used as a handling robot in order once again to open doors and hoods of the painted motor vehicle body.

Preferably, a central reading point for identifying the incoming coating objects and for controlling the subsequent treatment stations and also the distribution between the different parallel branches is arranged on the transport path before the branching. If the central reading point detects for example that a motor vehicle body which is to be painted with a frequently desired color ("high runner") is arriving on the transport path, this motor vehicle body can be fed in a targeted manner into that branch of the transport path which is provided for painting with high runners. In this case, the central reading point transmits the data relating to the incoming coating objects to a central painting control system or to the downstream treatment stations in the parallel branches of the transport path. This central painting control system advantageously means that no additional reading points are required in the individual parallel branches of the transport path.

The coating installation according to the invention is therefore preferably controlled by a central painting control system. In this case, a purely central embodiment is possible in which a central control unit is connected to all the components (e.g. painting booths, flash-off stations, conveyors, etc.) and controls these components. However, it is also possible as an alternative that a plurality of decentralized control modules are provided which are assigned to the individual processing stations, wherein the decentralized control modules are coordinated centrally by a central control unit. The function of the central control unit can in this case also be performed by one of the decentralized control modules.

The control may optionally take place according to the so-called "push principle" or according to the "pull principle". In the "pull principle", the individual painting booths or the associated decentralized control modules request the desired coating object from the central control unit. In the "push principle", on the other hand, the central control unit calculates how the individual coating objects are to be optimally distributed between the different painting booths, taking account of predefined optimization aims, and then feeds the coating objects to the respective painting booths.

Furthermore, it is possible within the scope of the invention that air conditioning varies among the treatment stations in the parallel branches of the transport path. For instance, the optimal air conditioning conditions differ with regard to temperature, humidity and falling air speed depending on the paint systems used (filler, base coat or clear coat), the type of atomizer used (air atomizer, electrostatic atomizer or high-speed rotary atomizer) and the shade. The differently air conditioned parallel branches of the transport paths allow optimal adaptation of the air conditioning to the respective individual requirements.

Another advantage of the coating installation according to the invention is the possible standardization of the installation technology by forming the individual treatment stations as standardized modules. In this way, it is possible for a coating installation to be built by the respective manufacturer and then inspected, tested or validated by the customer at the manufacturer's premises. In this case, commissioning therefore takes place not when the installation reaches the customer but rather already at the manufacturer's premises, as a result of which the subsequent set-up is possible much more easily.

The different treatment stations therefore preferably have uniform external dimensions and/or uniform connections for compressed air, coating agents, rinsing agents, data lines, supplied air and extracted air and also for preparing them for the booth and/or power supply, so that individual treatment stations can easily be replaced by other treatment stations.

Furthermore, it is possible within the scope of the invention that the transport path along the painting line branches not just once into a plurality of parallel branches, but rather a number of times one behind the other.

A drying station, in particular a plasma drying station or a radiation curing device, is preferably arranged in the transport path behind a coating station in the transport direction, which is moreover also possible in the case of transport paths without branchings.

It is also possible within the scope of the invention that the treatment stations in the different parallel branches of the transport path have a different explosion protection system and/or a different fire protection system. For example, the currently used silver paints and other paints contain less solvent and therefore exhibit a lower risk of fire or explosion. If just one such paint (e.g. silver paint) having a low tendency to explode or catch fire is applied in one branch of the transport path, then a less complicated fire and explosion protection system can be implemented in the associated coating station compared to the system implemented in the other branches of the transport path in which different colors are applied, which different colors have a higher solvent content and therefore are at a greater risk of exploding or catching fire. In the extreme case, it is even possible to dispense with an explosion and/or fire protection system completely in one branch of the transport path, if this branch is used only to apply paints which contain so little solvent that there is no risk of explosion or fire.

Preferably, the individual coating stations are designed as essentially closed booths which in each case have a booth entrance and a booth exit, wherein the booth entrance and/or the booth exit can be closed by a shutter, in particular by a roller shutter. In this case, the shutter advantageously prevents people from entering the painting booth via the transport path without authorization. Furthermore, a shutter allows a better air supply in the booth, as a result of which the painting quality is improved.

Preferably, the shutter to the painting booth is secured by a lock device, wherein the lock device can be operated for example by a key, a PIN code, a fingerprint or a code card.

Furthermore, it is possible within the scope of the invention to provide separate coating agent supply systems for water-based paint on the one hand and solvent-based paint on the other hand, wherein the two separate coating agent supply systems may feed the same painting robot or different painting robots.

In the preferred example of embodiment of the invention, the coating installation has a ring line or a special color supply line (optionally also with pig technology) which supplies the individual treatment stations (e.g. painting booths) with a coating agent or other fluid, wherein the treatment stations are arranged in a row one behind the other or next to one another, as known per se from the prior art. However, the invention provides a novel type of line guidance of the ring line, in which the supply line and the return line of the ring line in each case run in a substantially straight line along the row of treatment stations. In this case, therefore, the supply line and the return line of the ring line run parallel to one another in opposite directions, which allows shorter tubes and less paint in the circuit and reduces the investment costs and also simplifies the connection of special colors.

In this case, the ring line in the individual treatment stations in each case has an energy chain outlet, to which an energy chain (also known as a cable carrier) can be connected in order to supply devices in the individual treatment stations with the coating agent or other fluid, as known per se from DE 39 27 880 A1 and EP 0 842 706 A2, and therefore the content of these patent applications is hereby fully incorporated in the present description with regard to the configuration of the energy chain outlet. However, it is novel here that the energy chain outlet is arranged centrally in the individual treatment stations, namely relative to the row of treatment stations and/or relative to the individual treatment stations.

The term "ring line" used in the context of the invention is to be understood in a general sense and encompasses for example single-tube systems, double-tube systems and triple-tube systems, as known for example from Pavel Svejda: "Prozesse und Applikationsverfahren", Vincentz Verlag 2003, ISBN 3-87870-741-X, pages 107-111, and therefore the content of this book is hereby incorporated in the present description with regard to the construction of ring line systems. Furthermore, ring line systems are also known from EP 1 369 182 B1, and therefore the content of said document is also hereby fully incorporated in the present description with regard to the construction of ring line systems.

In one example of embodiment of the invention, the supply line of the ring line by contrast runs in a meandering fashion along the row of treatment stations and around the individual treatment stations, while the return line of the ring line runs in a substantially straight line along the row of treatment stations.

In a further example of embodiment of the invention, the supply line of the ring line by contrast runs in a substantially straight line along the row of treatment stations, while the return line of the ring line runs in a meandering fashion along the row of treatment stations and around the individual treatment stations.

In one variant of the invention, the meandering supply line or return line in each case forms a loop between the adjacent treatment stations, so that the meandering supply line or return line in each case runs on one side of the row of treatment stations, without changing side.

In another variant of the invention, the meandering supply line or return line by contrast changes from one side of the row of treatment stations to the opposite side of the row of treatment stations between the adjacent treatment stations.

From what has been stated above, it is already obvious that the treatment stations are preferably painting booths which, according to the prior art, have a number of areas which will be described briefly below. Firstly, the painting booths have a painting area, through which the individual coating objects are transported and in which the coating objects are coated. Arranged above this painting area is a so-called plenum which forms a pressure chamber, from which fresh air is blown downwards into the painting area from above through a filter ceiling. Furthermore, below the painting area, the painting booth has a so-called washing-out area, in which the excess coating agent ("overspray") coming from the painting area is washed out. A dry washing-out area using filters is possible as an alternative. Such dry washing-out areas are known for example from DE 10 2005 048 580 A1, and therefore the content of this patent application is hereby incorporated in the present description.

Finally, the painting booth also has a booth support, which mechanically supports the painting booth and is usually arranged below the washing-out area.

The invention also encompasses a novel guidance of the ring line in that the ring line runs at least partially through the plenum, through the washing-out area or through the booth support.

Furthermore, it should be mentioned that the invention relates not only to a coating installation as described above, but also to an operating method for such a coating installation.

In the context of the operating method according to the invention, a plurality of coating objects are transported along the transport path through the coating installation and are treated in a plurality of treatment stations (e.g. painting station, flash-off station, etc.), wherein the coating objects are distributed between a plurality of parallel branches of the transport path, in each of which at least one of the treatment stations is arranged.

The distribution of the coating objects between the different parallel branches of the transport path preferably takes place as a function of a process-defining parameter for a painting process. In the context of the operating method according to the invention, therefore, preferably the process-defining parameter is determined and then is taken into account when distributing the coating objects between the different branches of the transport path.

The process-defining parameter for the distribution of the coating objects may be for example the type (e.g. limousine, station wagon, coupé, convertible, pick-up, van, minivan, SUV or four-wheel drive vehicle) of coating object to be coated, since for example a luxury vehicle body with a high painting complexity can be painted in a different branch than a simple body with a lower painting complexity.

Furthermore, the process-defining parameter for the distribution of the coating objects may be the paint supplier or the respective paint. This is important since e.g. a paint from a manufacturer A may provide a paint volume flow of up to 450 ml/min and a paint from a different manufacturer B may provide a paint volume flow of up to 300 ml/min. This results in different process times for different colors or even different process times for the same shades from different paint manufacturers.

Moreover, the process-defining parameter for the distribution of the coating objects between the different parallel branches of the transport path may also be the color of the coating agent to be applied. For example, frequently desired colors ("high runners") can be applied in one specific branch of the transport path, while less frequent colors ("low runners") are applied in other branches of the transport path.

Furthermore, the respective required quality of the coating may also be taken into account as the process-defining parameter, since for example luxury vehicle bodies have to be painted to a higher quality than simple bodies. Painting processes which differ in terms of their quality may therefore take place in the individual branches of the transport path, wherein the coating objects are distributed between the associated branches depending on their respective quality requirements.

Furthermore, the process-defining parameter for the distribution of the coating objects may be the type of coating agent to be applied. For instance, both powder coats and wet coats may be applied in one coating line, wherein the coating objects, depending on the desired type of coating, are distributed between the associated branches of the transport path in which either a powder coat or a wet coat is applied.

Furthermore, it is possible that the respective risk of explosion and/or risk of fire of the coating agent to be applied is taken into account as the process-defining parameter for the distribution of the coating objects. If, for example, a coating object arrives which is to be coated with a coating agent which has no significant risk of fire or explosion, then this coating object can be transported into a branch of the transport path in which a coating station with no fire and/or explosion protection system is located. If, on the other hand, a coating object arrives which is to be coated with a coating agent which has a significant risk of fire or explosion (e.g. clear coat), then this coating object will be transported into a branch of the transport path in which a coating station with a fire and/or explosion protection system is located.

Coating-agent-specific painting parameters may also be taken into account when distributing the coating objects between the different parallel branches of the transport path.

It is also possible that, in the context of the operating method according to the invention, motor vehicle bodies on the one hand and ancillary parts on the other hand are distributed between different branches of the transport path, so that the different branches of the transport path and the treatment stations arranged thereon can be optimized with regard to the type of incoming coating objects.

It is also possible that frequently required colors on the one hand and rarely required colors on the other hand are applied in different branches of the transport path, so that optimization in this regard is also possible.

The order stipulated by the downstream production areas (such as final assembly) can also be used as an optimization aim.

In the context of the operating method according to the invention, identification of the incoming coating objects preferably takes place at a central reading station before the branching of the transport path, wherein the data are forwarded from the central reading station to a central painting control system so that there is no need for additional reading stations in the individual branches of the transport path. In the case of central identification of the incoming coating objects, therefore, preferably the present time is measured and stored so as to be able to take this into account as the painting control proceeds. The central painting control system then preferably continuously determines the position of all the incoming coating objects within the coating installation as a function of the identification by the central reading device and the associated time and taking account of the distribution between the different branches of the transport path and the process steps being carried out therein.

It is also possible within the scope of the operating method according to the invention that a treatment station in one branch of the transport path operates and for example applies paint or dries a coating object, while another treatment station in another branch of the transport path is installed, removed, repaired, tested or used for training purposes.

In one variant of the invention, it is furthermore provided that the processing progress in the individual branches is taken into account when distributing the coating objects between the individual branches of the transport path. If, for example, no coating object is located in one of the parallel branches of the transport path, then the next incoming coating object will preferably be assigned to this branch. In this way, it is possible to prevent a painting booth from being left empty.

Furthermore, it is provided in one variant of the invention that the incoming coating objects on the transport path are distributed between the individual parallel branches of the transport path as a function of one or more predefined optimization aims.

This optimization aim may be for example minimizing color losses or losses due to color changes. If an incoming coating object is to be painted with a specific color, this coating object will preferably be assigned to that branch of the transport path in which the same color has already been or will be painted, so that no color change is necessary in this branch and accordingly also no losses due to color changes occur.

Another optimization aim is for example to minimize the size of the buffer storage area for the coating objects on the entrance side and/or exit side. For instance, the coating objects arriving on the transport path have to wait in the entrance-side buffer storage area until the desired color can be painted. In this case, the central painting control system, via the central reading point, determines the desired color for the coating objects arriving one behind the other, which coating objects are then distributed between the individual branches in such a way that the waiting time and thus the required size of the buffer storage area on the entrance side is minimized.

Another possible optimization aim when distributing the coating objects is to maximize the coating capacity of the coating installation. For example, the reservation of a complete branch for reserving a high runner advantageously reduces the losses due to color changes, but the painting capacity is then not optimal in some circumstances if few high runners have to be painted. On the other hand, frequent color changes also lead to a reduction in the painting capacity of the painting installation as a whole, due to the color change time that is required. The incoming coating objects will therefore preferably be distributed between the individual parallel branches in such a way that the painting capacity is at a maximum.

Furthermore, an optimization aim when distributing the individual coating objects may be to achieve the most even possible distribution of different types of coating object according to the required production of each respective type.

Moreover, the distribution of the incoming coating objects between the individual parallel branches of the transport path may be optimized in such a way as to react in an optimal manner to requirements from the entrance-side construction area and/or the exit-side final assembly area.

Another possible optimization aim may be to achieve the best possible coating quality.

Furthermore, the incoming objects may be distributed between the parallel branches of the transport path in such a way as to minimize or at least temporally limit the standing time of the so-called skids.

Finally, yet another optimization aim is possible, according to which the storage time of the coating agents used is minimized or at least temporally limited, in order to avoid settling of the coating agents in the case of relatively long storage times.

Some of the abovementioned optimization aims can be combined with one another, as has already been indicated above. Preferably, the individual optimization aims are therefore assigned different priorities, so that the optimization takes place by software in a manner graduated for the different ranks of optimization aims. By way of example, the minimization of color losses may be a primary optimization aim, while the maximization of the painting capacity is merely a secondary optimization aim.

The invention also encompasses the idea that a plurality of painting process steps are carried out one after the other on the same coating object (e.g. a motor vehicle body) in a single painting cabin, without the coating object being transported further in the interim. By way of example, it is possible that a primer, a base coat and a clear coat are applied one after the other to one and the same coating object in one and the same painting booth. Furthermore, it is possible that an internal painting and an external painting takes place on one and the same coating object in one and the same painting booth.

Figure 2:
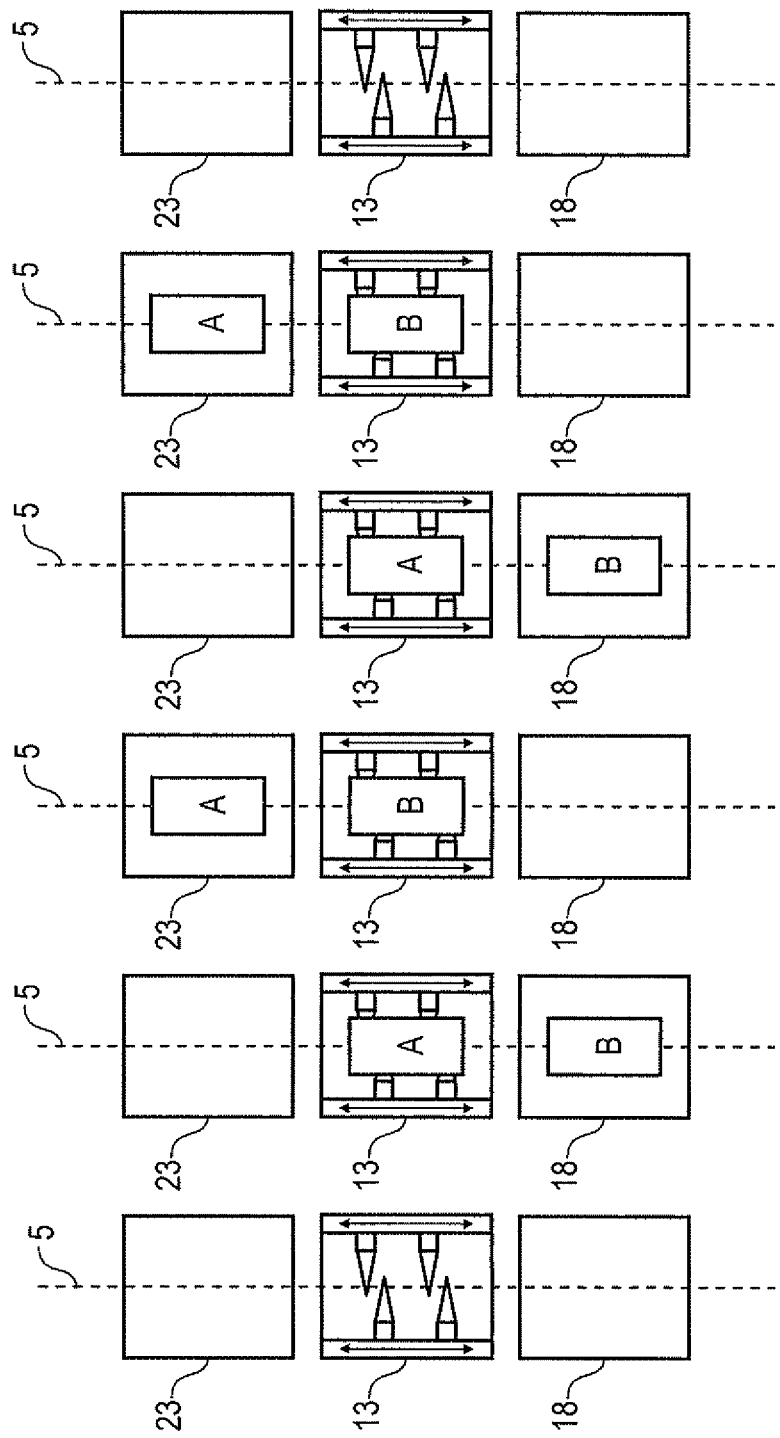
Figure 3:
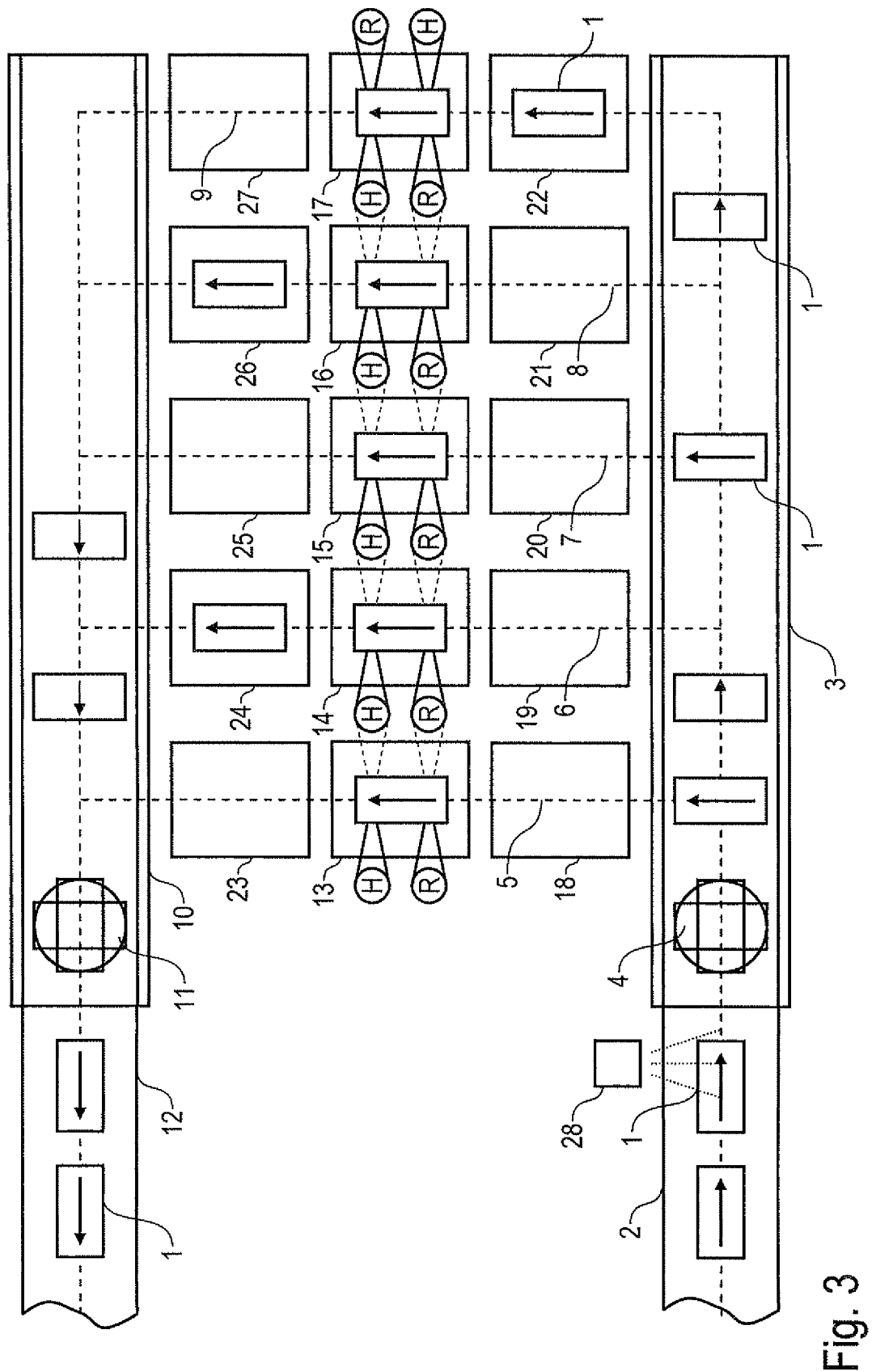
Figure 4:
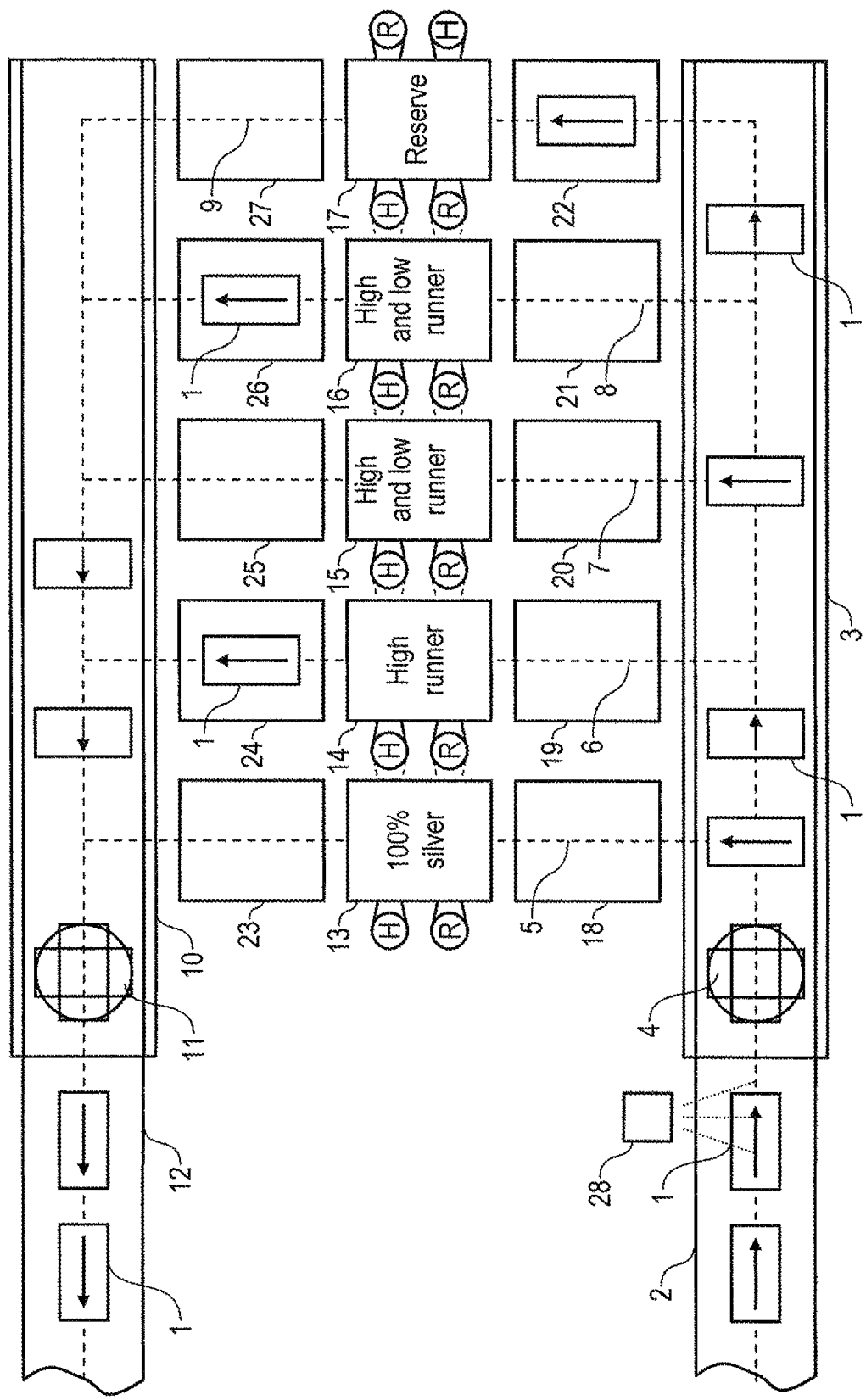
Figure 5:
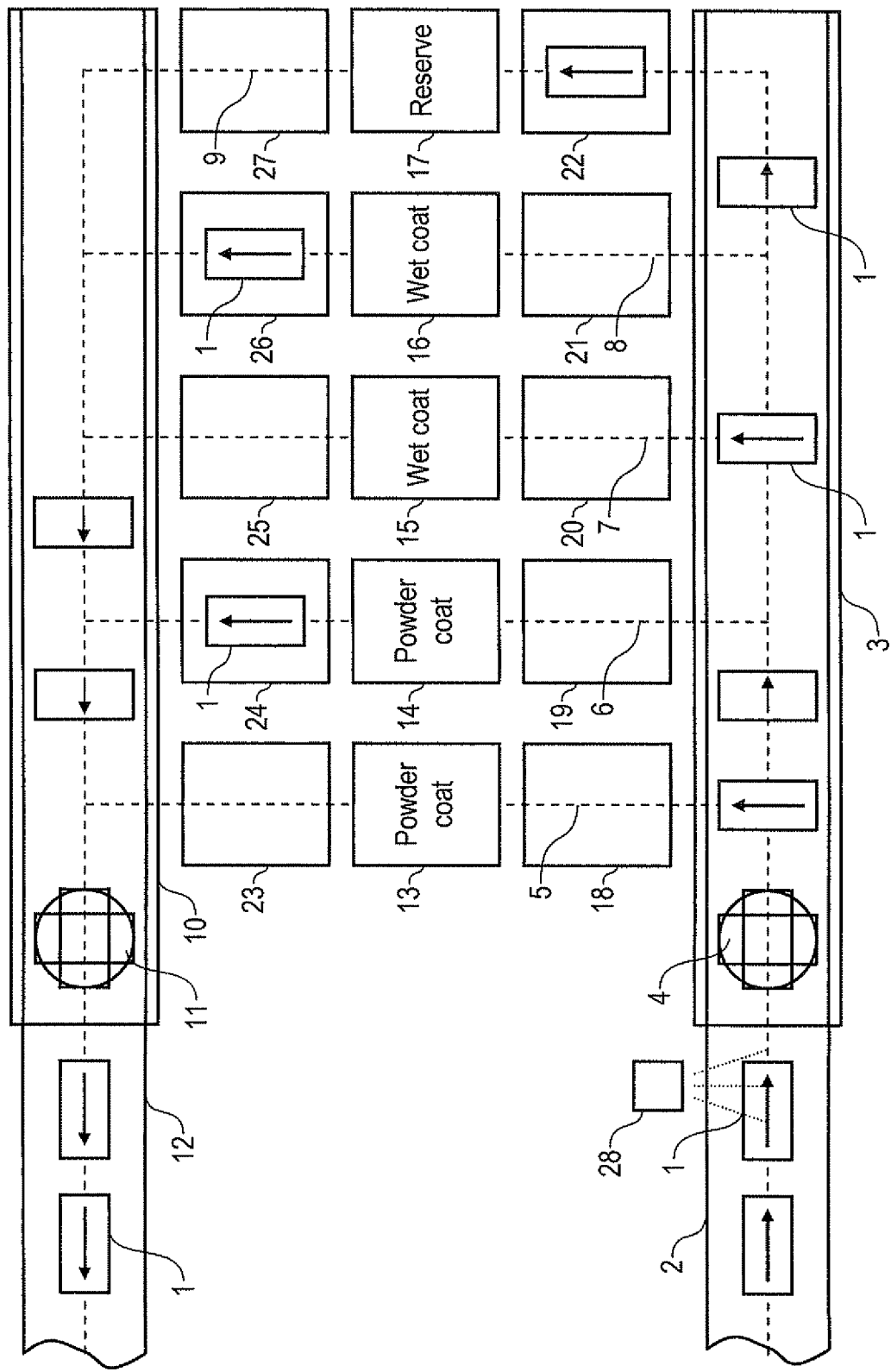
Figure 6:
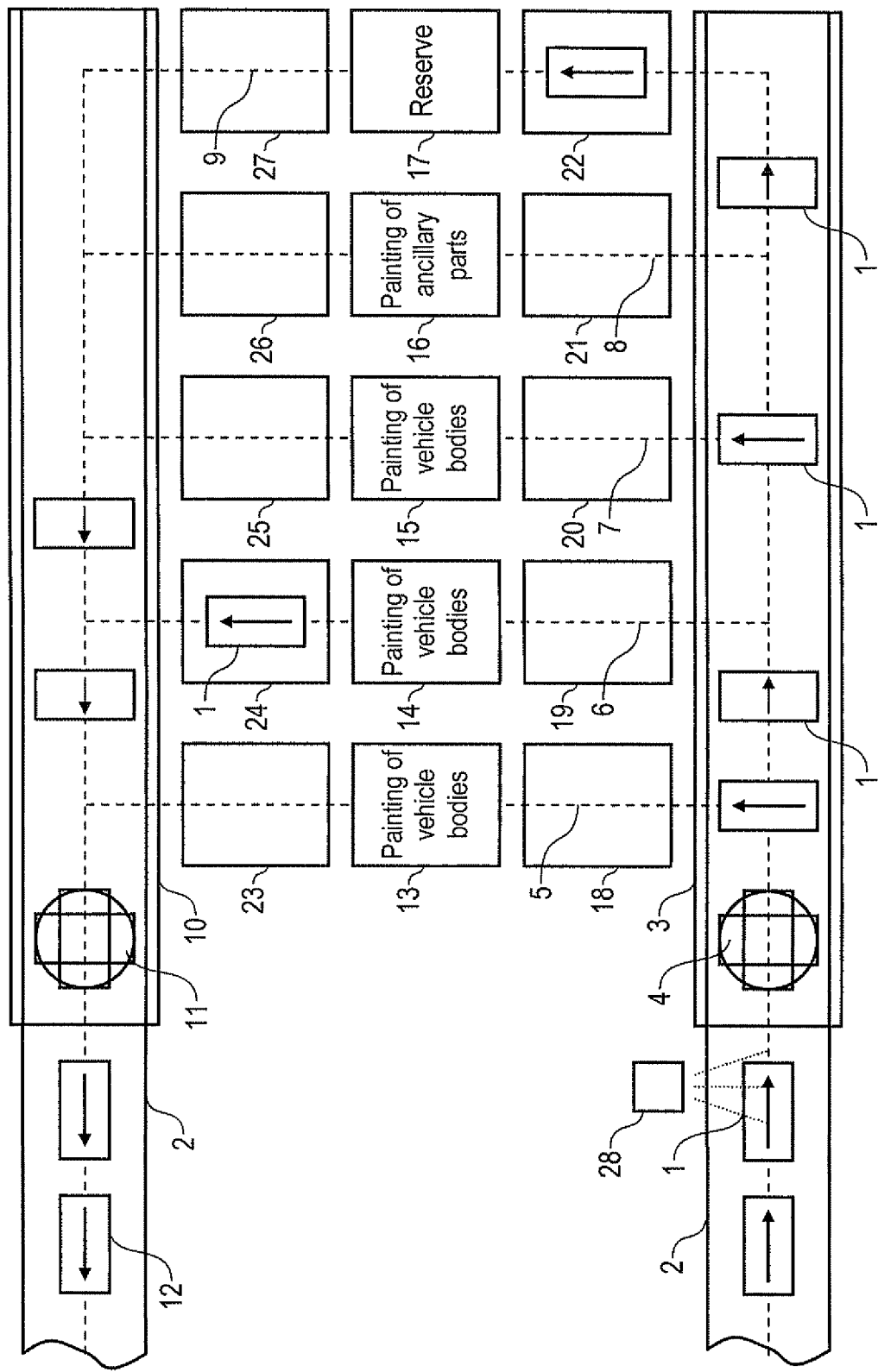
Figure 7:
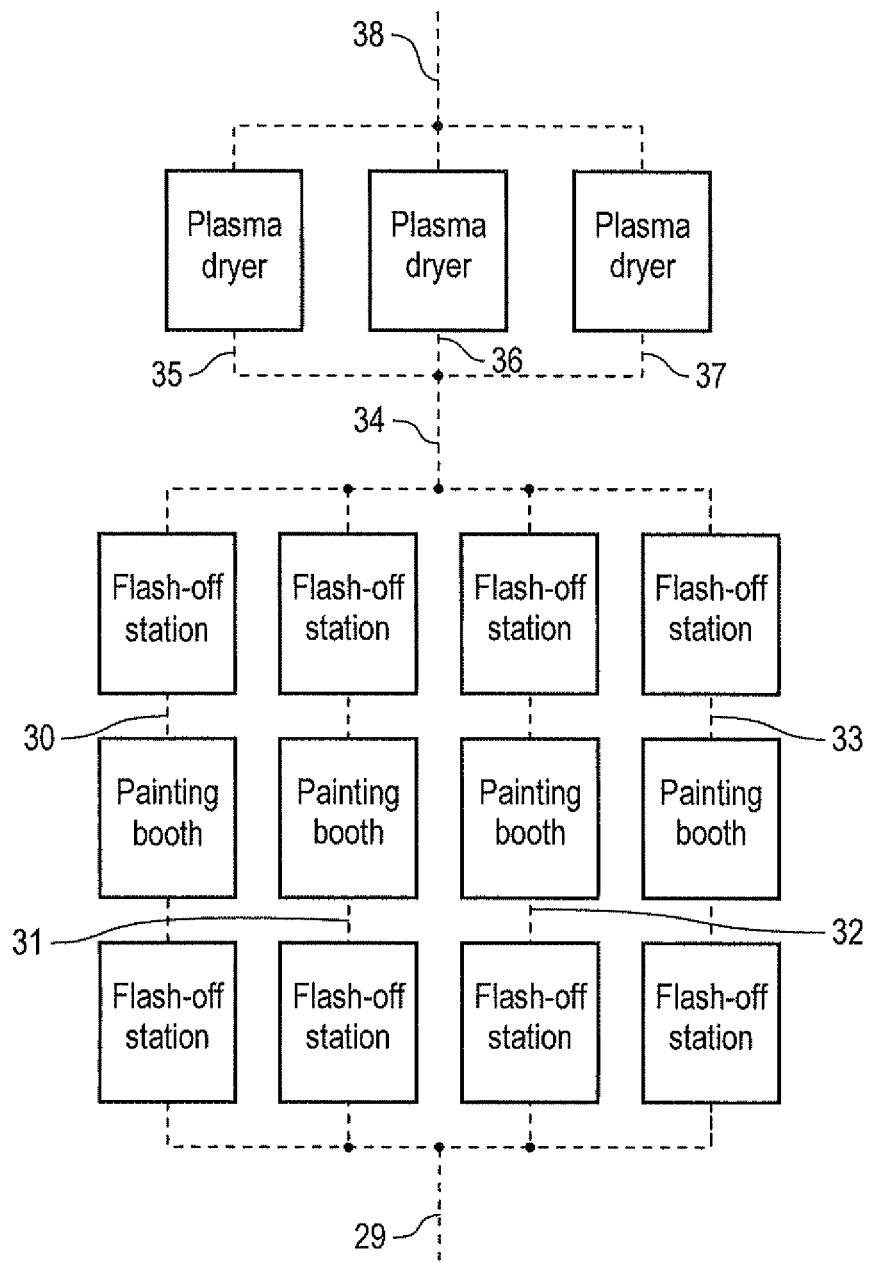
Figure 8:
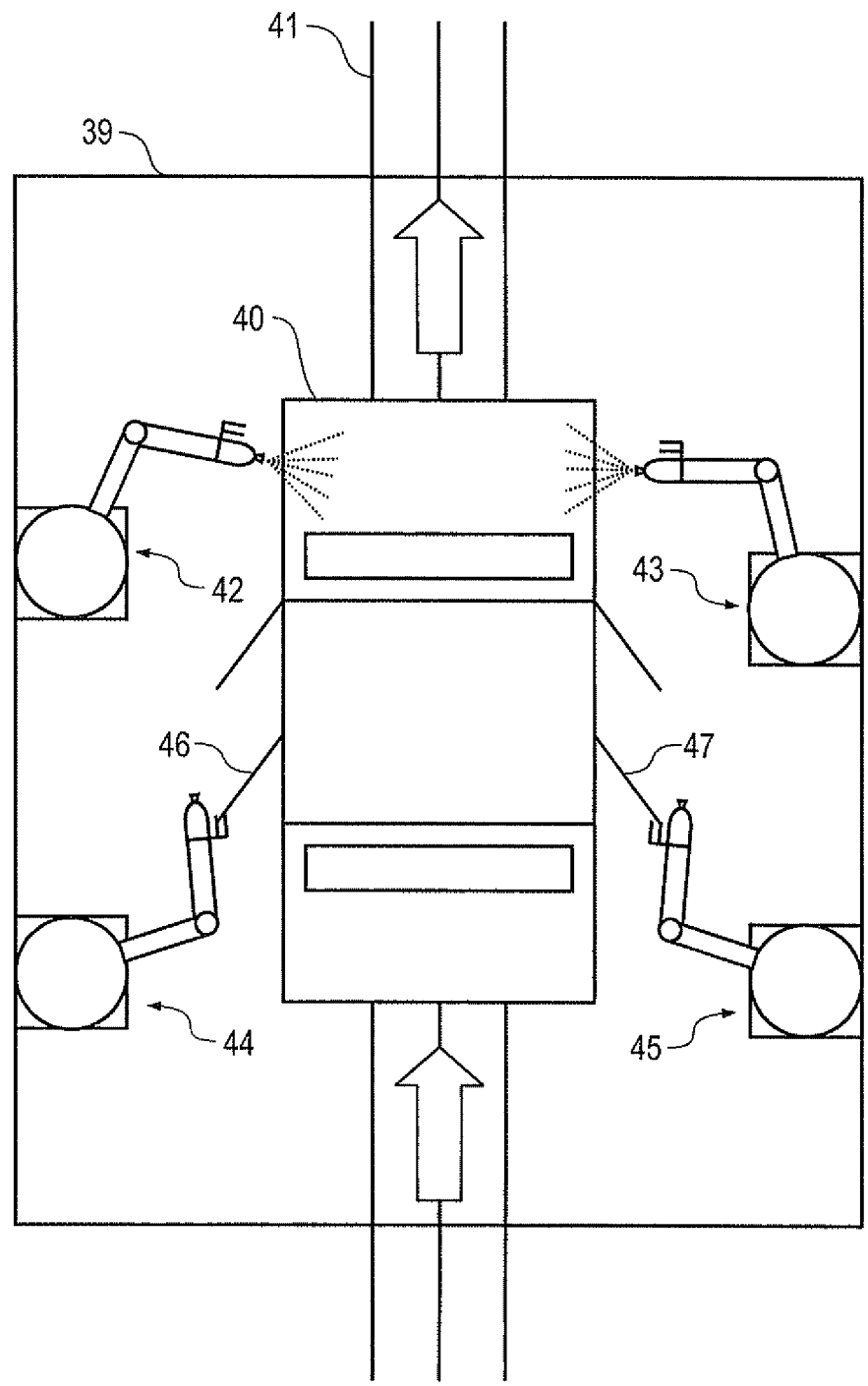
Figure 9:
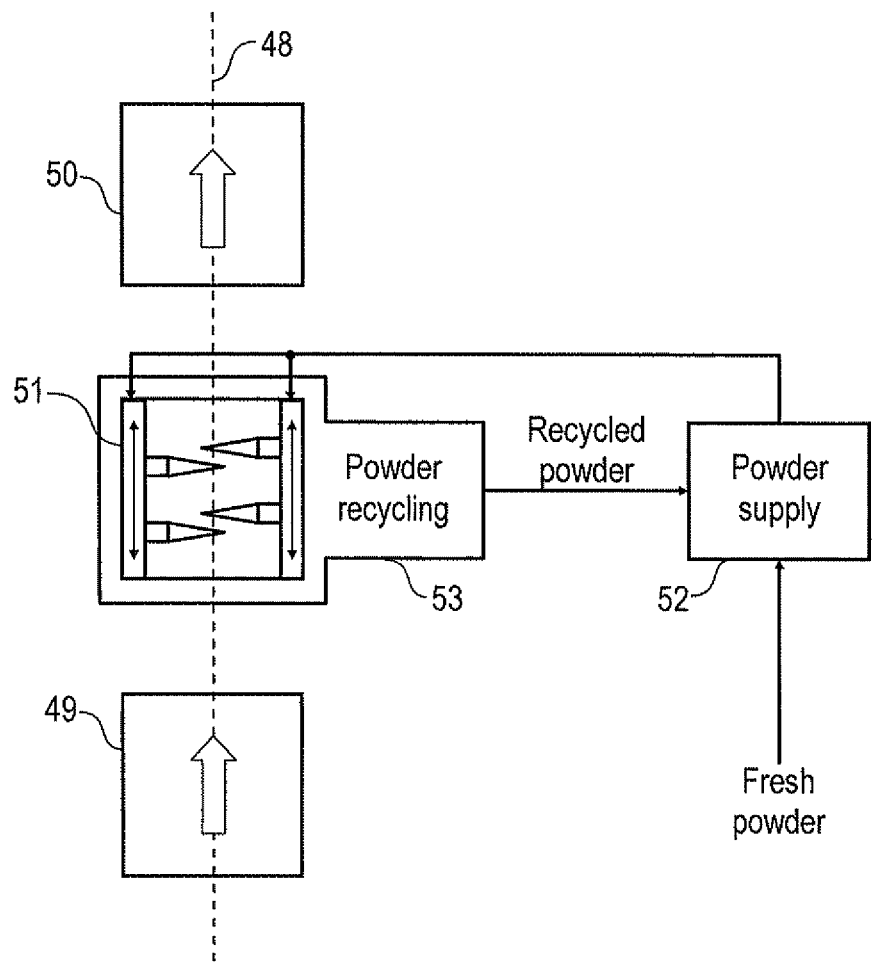
Figure 10:
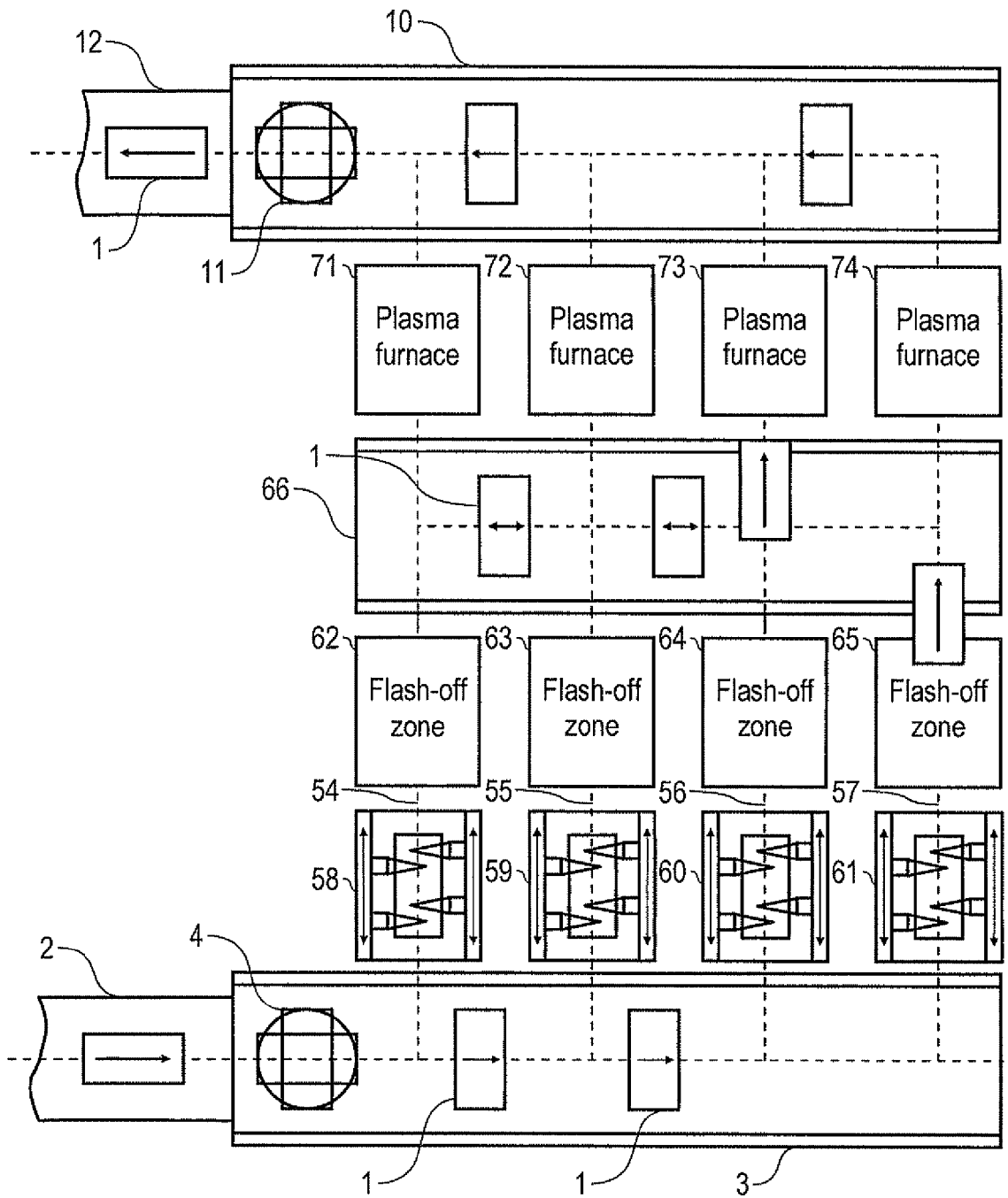
Figure 11:
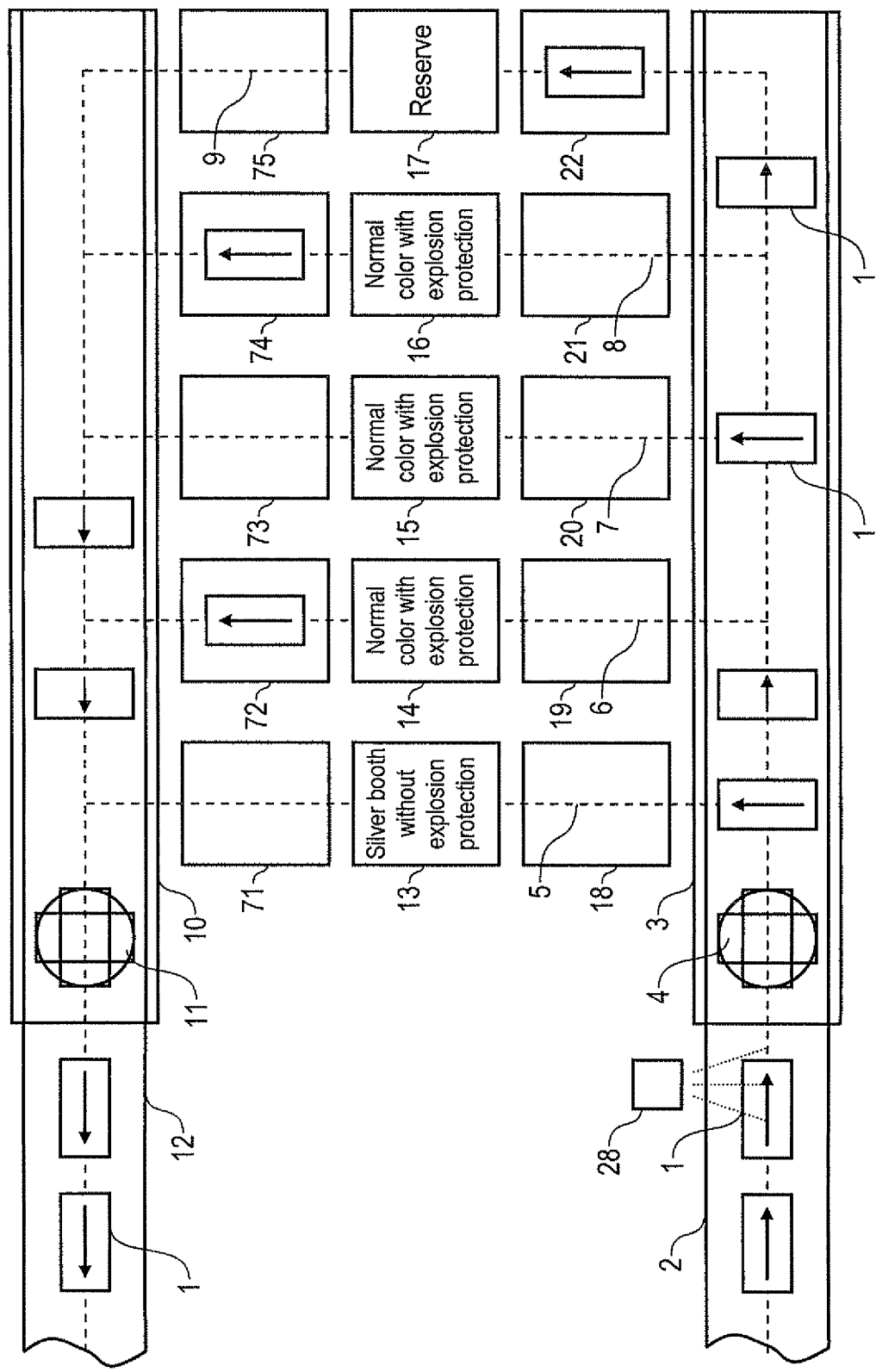
Figure 12:
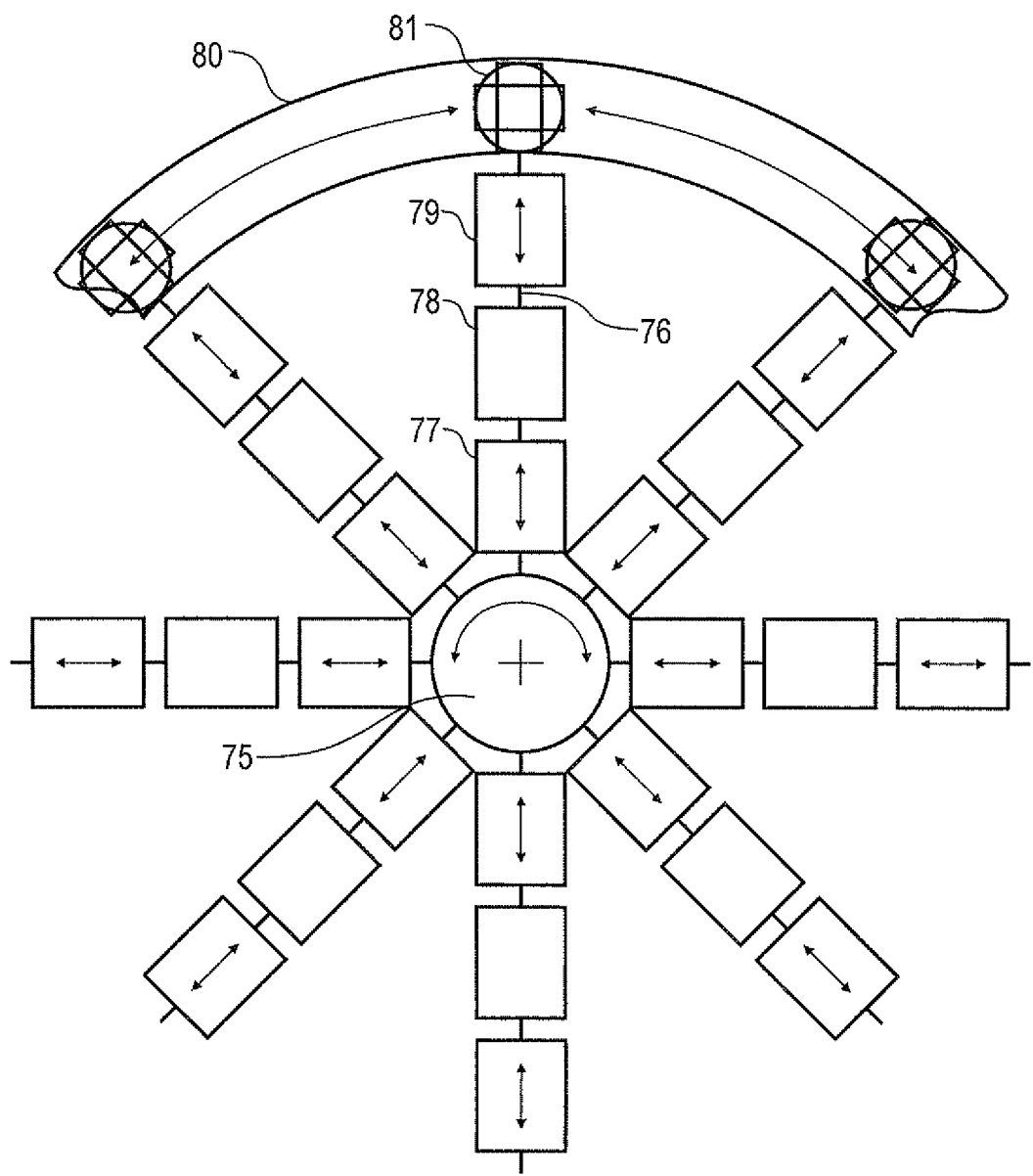
Figure 13:
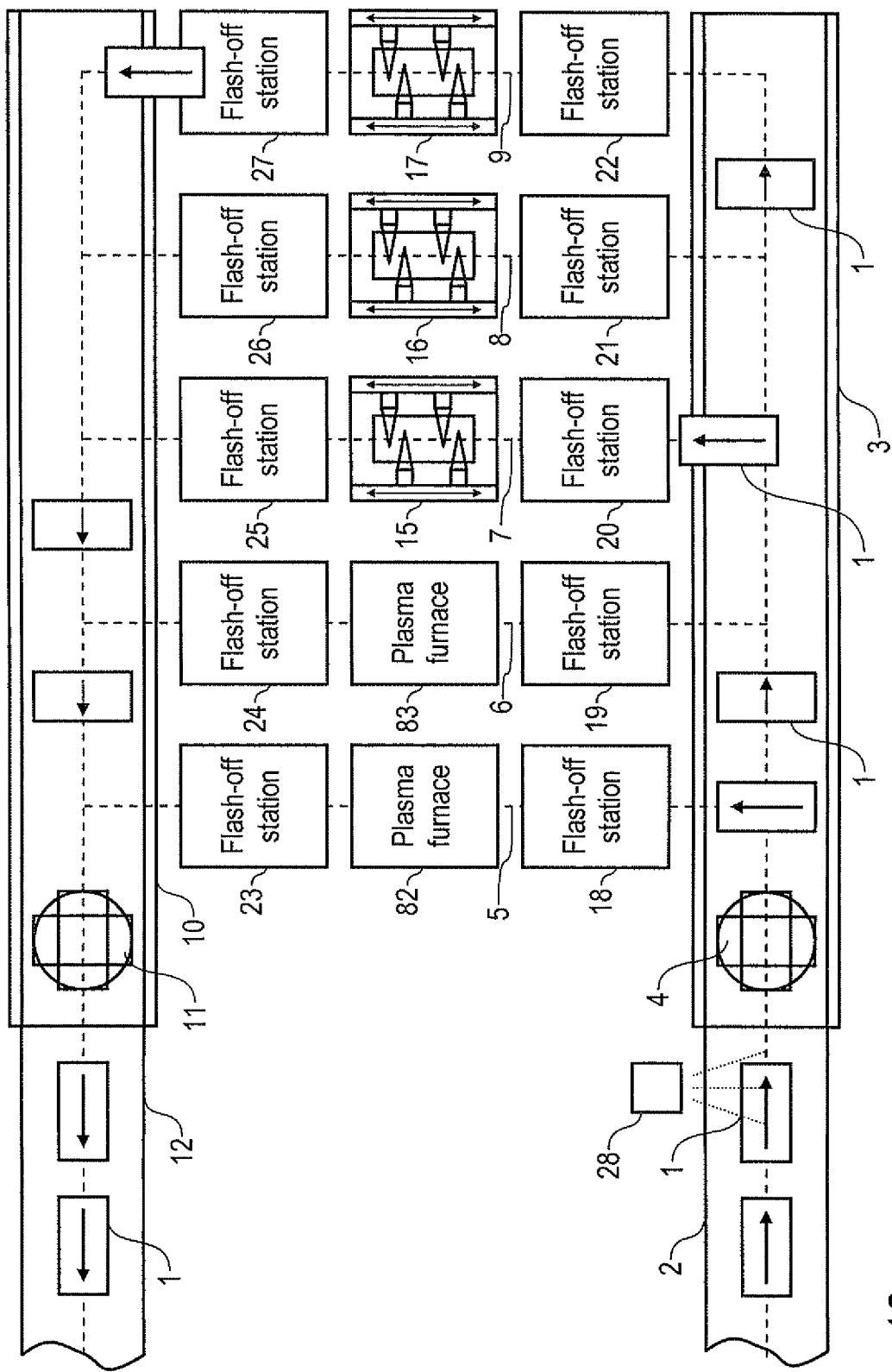
Figure 14A:
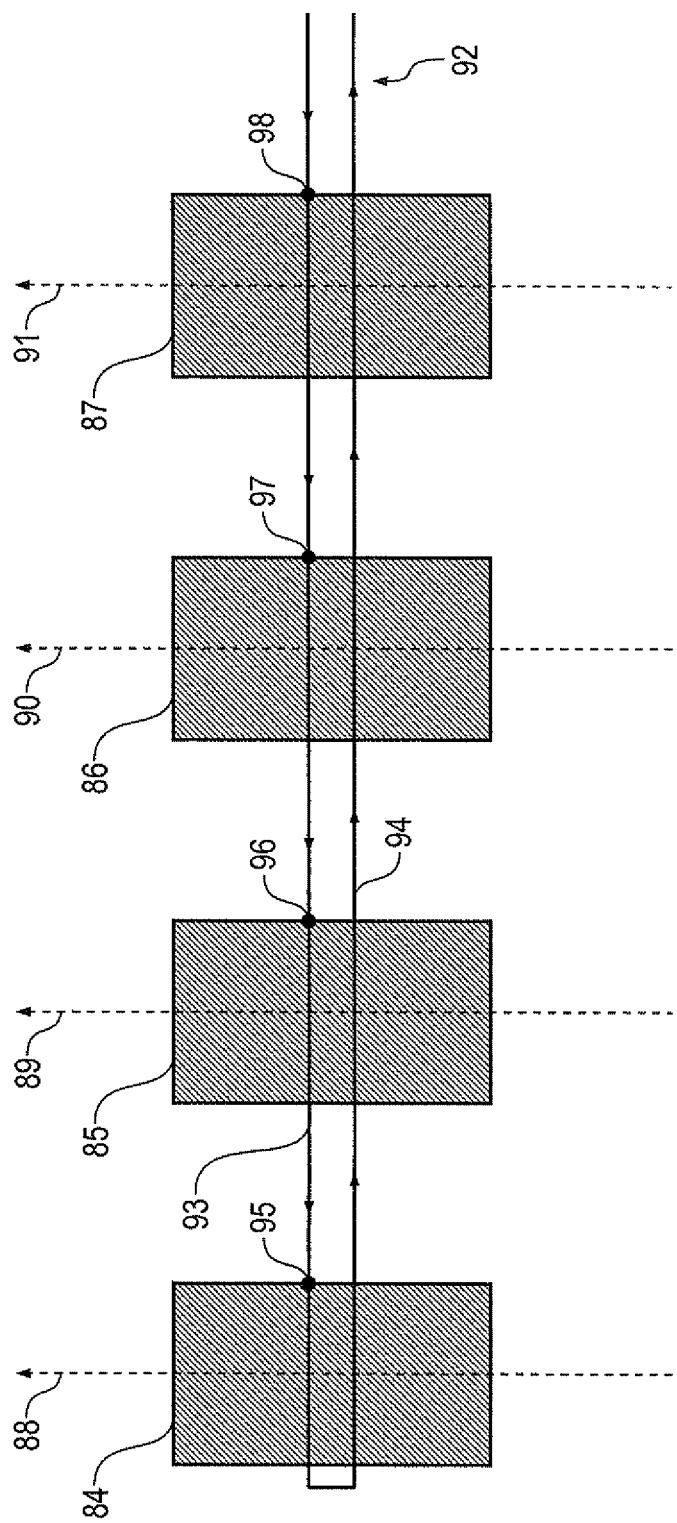
Figure 14B:
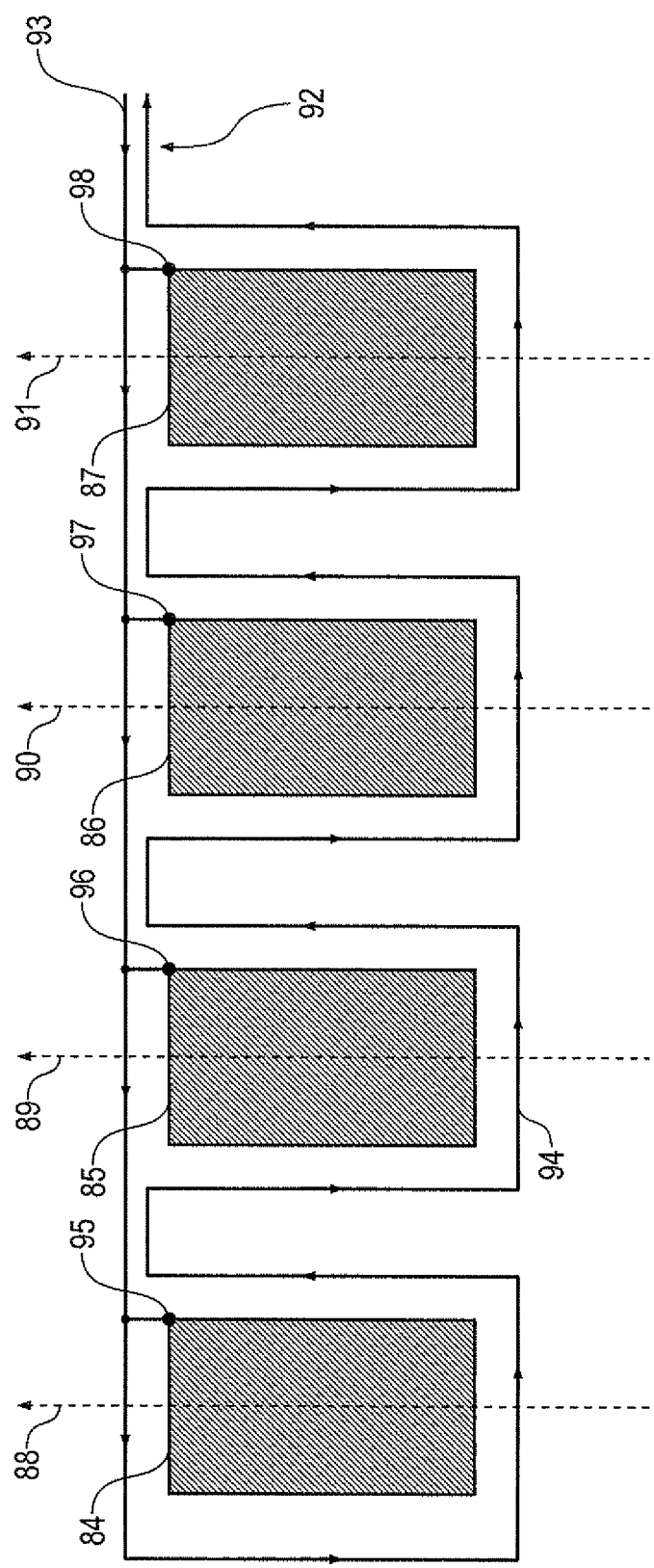
Figure 14C:
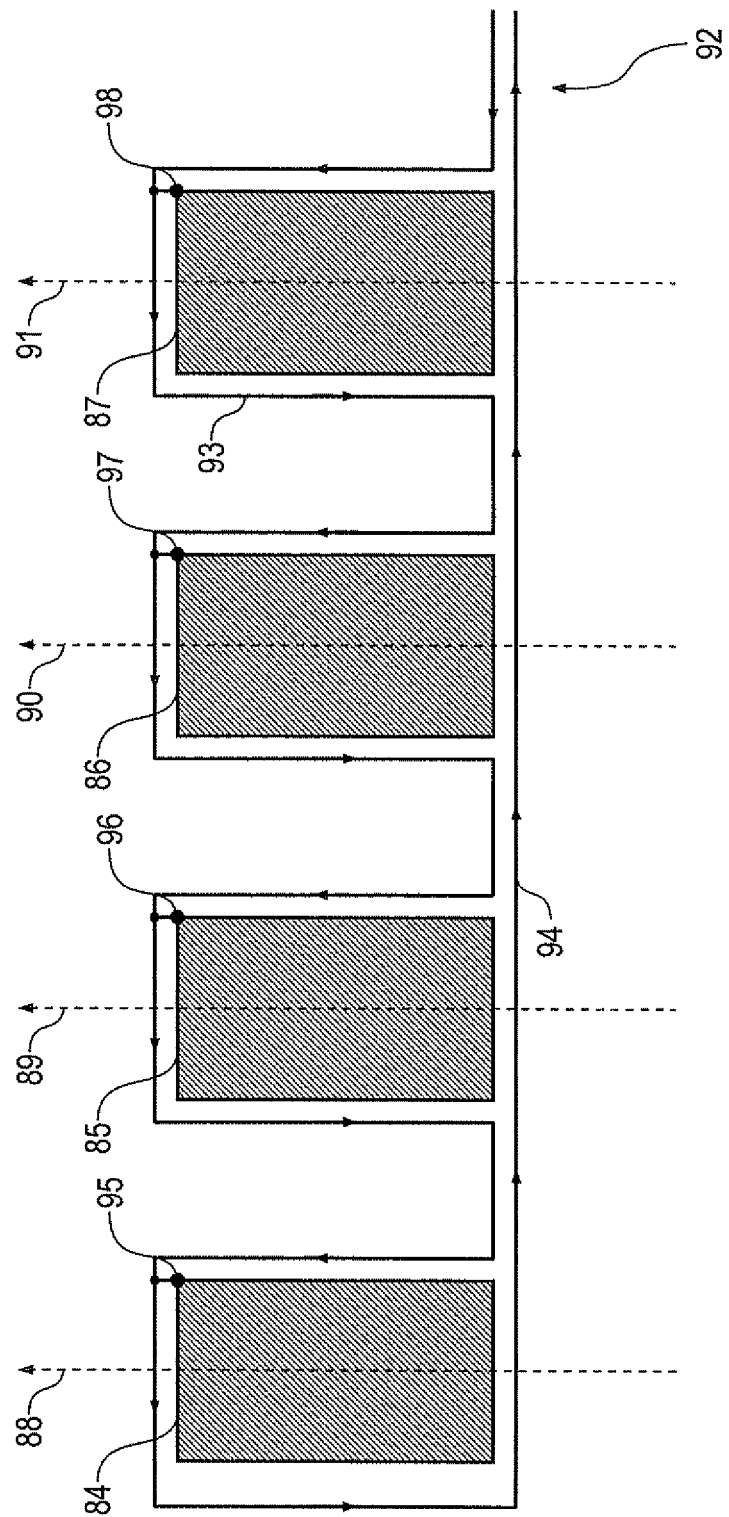

Other advantageous further developments of the invention are characterized in the dependent claims or will be explained in more detail below together with the description of preferred examples of embodiments of the invention with reference to the figures, in which:

FIG. 1 shows a schematic view of a coating installation according to the invention with a transport path which branches into a plurality of parallel branches, in each of which two flash-off stations and one painting station are located, FIGS. 2a-2f show different successive operating phases for the individual branches of the transport path in the coating installation according to FIG. 1, FIG. 3 shows a modification of the example of embodiment according to FIG. 1, in which robots which control the painting stations in the two adjacent branches of the transport path are arranged between the adjacent branches of the transport path, FIG. 4 shows a modification of the example of embodiment according to FIG. 3, in which high runners are applied in one transport path while low runners are applied in another branch of the transport path, FIG. 5 shows a modification of the example of embodiment according to FIG. 1, in which powder coat is applied in some branches of the transport path while wet coat is applied in the other branches of the transport path, FIG. 6 shows a modification of the example of embodiment according to FIG. 5, in which vehicle bodies are painted in some branches of the transport path while only ancillary parts are painted in another branch of the transport path, FIG. 7 shows a simplified, highly schematic view of a coating installation according to the invention, in which the transport path has a plurality of branchings one after the other, FIG. 8 shows a painting station with two clear coat painting robots and two base coat painting robots, all of which robots can also be used as handling robots, FIG. 9 shows a branch of a coating installation according to the invention with a monochromatic coating installation and a monochromatic recycling device, FIG. 10 shows a schematic view of a further example of embodiment, in which the transport path has a plurality of branchings one after the other, FIG. 11 shows a modification of the example of embodiment according to FIG. 1, in which a different explosion protection system is provided in the individual parallel branches of the transport path, FIG. 12 shows a further example of embodiment of a coating installation according to the invention with a radial pattern of the individual branches of the transport path, FIG. 13 shows a modification of the example of embodiment according to FIG. 1 with a plurality of plasma dryers, FIG. 14A shows a new type of ring line arrangement with line guidance in a straight line, FIG. 14B shows a further ring line arrangement with meandering line guidance, and FIG. 14C shows an alternative ring line arrangement with meandering line guidance.

FIG. 1 shows part of a painting installation according to the invention for painting motor vehicle bodies 1, wherein the motor vehicle bodies 1 are supplied via a linear transport path 2 on the entrance side. The transport path 2 opens into a transverse displacement section 3, which has on the entrance side a rotary device 4 which rotates the motor vehicle bodies through 90° about the vertical so that the motor vehicle bodies 1 on the transverse displacement section 3 are oriented at right angles to the conveying direction.

The transverse displacement section 3 serves as a switch for distributing the motor vehicle bodies 1 between a plurality of parallel branches 5-9 which form a continuation of the entrance-side transport path 2. To this end, the transverse displacement section 3 transports the motor vehicle bodies 1 to in front of the desired branch 5-9, whereupon the motor vehicle bodies 1 are then transported into the desired branch 5-9 at right angles to the transverse displacement section 3.

At the exit side, the individual parallel branches 5-9 of the transport path 2 open into a further transverse displacement section 10, which at the exit side also has a rotary device 11. The rotary device 11 again rotates the motor vehicle bodies 1 supplied by the transverse displacement path 10 through 90° about the vertical, so that the motor vehicle bodies 1 are again parallel to their transport direction as they leave the transverse displacement section 10.

Finally, the motor vehicle bodies 1 then pass into a transport path 12 on the exit side, via which the motor vehicle bodies are transported away in the conventional manner.

A painting booth 13-17 is arranged in each of the individual parallel branches 5-9, so that painting of the motor vehicle bodies 1 is possible in each of the branches 5-9.

Furthermore, an entrance-side flash-off station 18-22 and an exit-side flash-off station 23-27 is located in each of the parallel branches 5-9.

The drawing also shows a central reading station 28, which identifies the incoming motor vehicle bodies 1. The identification of the incoming motor vehicle bodies 1 is important for the central control of the painting installation as a whole, so that the incoming motor vehicle bodies 1 can be distributed between the different branches 5-9 in an optimal manner.

For example, it is desirable to minimize the losses due to color changes. This can be achieved by distributing the incoming motor vehicle bodies 1 where possible to that branch 5-9 in which the desired color is already being painted, so that no color change is necessary in said branch.

The mode of operation of the painting installation described above and shown in FIG. 1 will now be described with reference to FIGS. 2a-2f, wherein only the branch 5 is shown for the sake of simplification. However, operation takes place in a corresponding manner in the other branches 6-9.

FIG. 2a shows the state of the branch 5 of the painting installation at the start, wherein there is no motor vehicle body either in the two flash-off stations 18, 23 or in the painting booth 13.

The transverse displacement section 3 then conveys two motor vehicle bodies A, B one after the other into the branch 5, so that motor vehicle body A is located in the painting booth 13 and motor vehicle body B is located in the flash-off station 18, as shown in FIG. 2b. In this phase, motor vehicle body A is then painted in the painting booth 13, while motor vehicle body B waits in the flash-off station 18.

The two motor vehicle bodies A, B are then conveyed further by one station in the branch 5 in the direction of the exit, so that motor vehicle body A is located in the exit-side flash-off station 23 and motor vehicle body B is located in the painting booth 13, as shown in FIG. 2c. In this phase, the previously painted motor vehicle body A is dried in the flash-off station 23, while motor vehicle body B is painted for the first time in the painting booth 13.

Thereafter, the two motor vehicle bodies A, B are then transported back by one station in the branch 5, so that motor vehicle body A is again located in the painting booth 13 and motor vehicle body B is located in the entrance-side flash-off station 18, as shown in FIG. 2d. Motor vehicle body A is then painted for a second time in the painting booth 13, while the motor vehicle body B previously painted for the first time dries in the entrance-side flash-off station 18.

The two motor vehicle bodies A, B are then again transported by one station in the direction of the exit, so that motor vehicle body A is located in the exit-side flash-off station 23 and motor vehicle body B is located in the painting booth 13, as shown in FIG. 2e. In this phase, the motor vehicle body A previously painted for the second time then dries in the exit-side flash-off station 23, while motor vehicle body B is painted for the second time in the painting booth 13.

Finally, at the end of the second painting process, the two motor vehicle bodies A, B are then transported away out of the branch 5, so that no motor vehicle bodies A, B or 1 are located in the two flash-off stations 18, 23 and in the painting booth 13, as shown in FIG. 2f.

The example of embodiment shown in FIG. 3 largely corresponds to the example of embodiment described above and shown in FIGS. 1 and 2a-2f, and therefore, in order to avoid repetitions, reference is made to the above description, the same references being used for corresponding components.

One particular feature of this example of embodiment is that in each case a painting robot R and a handling robot H are arranged between the adjacent painting booths 13-17, wherein the handling robot H and the painting robot R operate the two adjacent painting booths 13-17. To this end, the individual painting booths 13-17 are arranged close enough next to one another that in each case two adjacent painting booths 13-17 are located within the range of the handling robot H arranged therebetween and the painting robot R arranged therebetween.

This offers the advantage of being able to dispense with numerous robots.

The example of embodiment shown in FIG. 4 largely corresponds to the example of embodiment described above and shown in FIG. 3, and therefore, in order to avoid repetitions, reference is made to the above description, the same references being used for corresponding components.

One particular feature of this example of embodiment is that the painting booth 13 is provided exclusively for painting the most frequently desired paint, which is currently silver in Europe and white in Asia. Accordingly, the painting booth 13 in this example of embodiment also has no color change devices. If the central reading device 28 thus detects on the entrance side that the incoming motor vehicle body 1 is to be painted silver, then the transverse displacement section 3 will be actuated in such a way that the associated motor vehicle body 1 is transported into the branch 5.

By contrast, the branch 6 in this example of embodiment serves for painting frequently desired colors ("high runners"), wherein the painting booth 14 in the branch 6, in contrast to the painting booth 13 in the branch 5, allows a color change between the different frequently desired colors.

By contrast, the painting booths 15 and 16 in the branches 7 and 8, respectively, are used both for painting frequently desired colors ("high runners") and for painting rarely desired colors ("low runners").

Finally, another particular feature of this example of embodiment is that the branch 9 serves exclusively as a reserve and is not required during normal painting operation. The painting booth 17 in the branch 9 can therefore be used for example for maintenance purposes or for repair works, without affecting the capacity of the painting installation as a whole.

FIG. 5 shows a further example of embodiment of a coating installation according to the invention, which largely corresponds to the examples of embodiments described above and therefore, in order to avoid repetitions, reference is made to the above description, the same references being used for corresponding components.

One particular feature of this example of embodiment is that the painting booths 13, 14 in the branches 5, 6 apply only a powder coat, while the painting booths 15, 16 in the branches 7, 8 apply only a wet coat. The coating installation in this example of embodiment thus allows optionally the application of powder coat and wet coat. If the central reading station 28 detects that the incoming motor vehicle body 1 is to be painted with powder coat, then the central painting control system actuates the transverse displacement section 3 in such a way that the motor vehicle body 1 is conveyed either into the branch 5 or into the branch 6. If, on the other hand, the central reading station 28 detects that the incoming motor vehicle body 1 is to be painted with wet coat, then the central painting control system actuates the transverse displacement section 3 in such a way that this motor vehicle body 1 is transported either into the branch 7 or into the branch 8.

The example of embodiment shown in FIG. 6 again largely corresponds to the examples of embodiments described above and therefore, in order to avoid repetitions, reference is made to the above description, the same references being used for corresponding components.

One particular feature of this example of embodiment is that the painting booths 13, 14, 15 in the branches 5, 6, 7 are used only to paint the motor vehicle bodies 1, while the painting booth 16 in the branch 8 is used to paint ancillary parts. The painting booth 16 can therefore be optimized with regard to the specific requirements for painting ancillary parts, while the other painting booths 13-15 can be optimized with regard to the specific requirements of painting the motor vehicle bodies 1.

FIG. 7 shows a further example of embodiment of a coating installation according to the invention in a highly simplified, schematic form.

Here, a transport path 29 on the entrance side branches into four parallel branches 30-33, which are combined again at the exit side to form a common transport path 34. The common transport path 34 then branches again into three parallel branches 35, 36, 37, which are then once more combined again on the exit side to form a common transport path 38.

Located one behind the other in each of the branches 30-33 are two flash-off stations and a painting booth arranged therebetween, as has already been described above with reference to FIGS. 1 and 2a-2f.

By contrast, located in each of the branches 35-37 is a plasma dryer which dries the coating objects, as known per se from the prior art.

FIG. 8 shows a simplified example of embodiment of a painting booth 39 for painting a motor vehicle body 40, wherein the motor vehicle body 40 is transported along a transport path 41 through the painting booth 39. The transport path 41 may for example be one of a plurality of parallel branches, as described above.

Located in the painting booth 39 are two clear coat painting robots 42, 43 and two base coat painting robots 44, 45, wherein both the two clear coat painting robots 42, 43 and the two base coat painting robots 44, 45 can also be used as handling robots. In FIG. 8, the two clear coat painting robots 42, 43 are applying a clear coat to the motor vehicle body 40, while the two base coat painting robots 44, 45 are not applying a base coat but instead are being used as handling robots to open doors 46, 47 of the motor vehicle body 40.

FIG. 9 shows a further example of embodiment with a coating installation according to the invention having a transport path 48, in which two flash-off stations 49, 50 and a monochromatic painting station 51 are arranged one behind the other. The painting station 51 here serves to apply a powder coat which is provided by a powder supply device 52, wherein the powder supply device 52 is partly supplied with fresh powder coat and partly with recycled powder.

The recycled powder is collected here by a powder recycling device 53 on the painting station 51. It is advantageous here if the collected recycling powder is monochromatic and is therefore highly suitable for reuse.

FIG. 10 shows a further example of embodiment of a coating installation according to the invention, which largely corresponds to the examples of embodiments described above and therefore, in order to avoid repetitions, reference is made to the above description, the same references being used for corresponding components.

One particular feature of this example of embodiment is that the transverse displacement device 3 supplies four parallel branches with the motor vehicle bodies 1, wherein a painting booth 58-61 and a flash-off station 62-65 are arranged in each of the parallel branches 54-57.

The branches 54-57 open into an additional transverse displacement section 66, which in turn supplies four parallel branches 67-70 with the motor vehicle bodies 1. A plasma furnace 71-74 is arranged in each of the parallel branches 67-70.

Finally, FIG. 11 again shows an example of embodiment of a painting installation according to the invention, which largely corresponds to the examples of embodiments described above and therefore, in order to avoid repetitions, reference is made to the above description.

One particular feature of this example of embodiment is that only silver or another high runner which contains little solvent and therefore has only a low risk of fire and/or explosion is applied in the painting booth 13. Accordingly, the painting booth 13 does not have an explosion protection system.

By contrast, the painting booths 14-16 are used to apply other colors with a higher solvent content and a correspondingly higher risk of fire and/or explosion, and therefore the painting booths 14-16 are equipped with an explosion protection system which is known from the prior art and therefore need not be described in greater detail here.

FIG. 12 shows an alternative example of embodiment of a painting installation according to the invention for painting parts of motor vehicle bodies.

Arranged in the centre here is a spiral lift 75 which is known per se and supplies the individual coating objects via a lifting movement.

The individual coating objects are then distributed between eight radially running branches 76 of the transport path, wherein three processing stations 77, 78, 79 are arranged in each of the individual branches 76. In this example of embodiment, the processing station 78 is a painting booth, while the processing stations 77, 79 are flash-off stations. However, the processing stations 77-79 may also be other processing stations as already described in detail above.

On the exit side, the individual radial branches 76 of the transport path open into a common ring conveyor 80 which is arranged at the periphery of the star-shaped arrangement and can convey the individual coating objects bidirectionally in the circumferential direction. The ring conveyor 80 has a rotary device 81 at each of the opening points of the individual radial branches 76 of the transport path, by means of which rotary device the individual coating objects can in each case be rotated about their height axis into the conveying direction of the ring conveyor 80.

Finally, FIG. 13 shows a modification which largely corresponds to the example of embodiment shown in FIG. 1 and therefore, in order to avoid repetitions, reference is made to the above description, the same references being used for corresponding components.

One particular feature of this example of embodiment is that a respective plasma furnace 82, 83 is provided instead of the two painting booths 13, 14.

FIG. 14A shows a ring line arrangement according to the invention for supplying a plurality of painting booths 84-87 with the coating agent to be applied.

Here, the individual painting booths 84-87 are arranged next to one another in one row in a plurality of parallel branches 88-91, wherein the coating objects (e.g. motor vehicle bodies) to be painted are transported in the arrow direction along the branches 88-91 through the painting booths 84-87.

Here, the coating agent supply takes place through a ring line 92 having a supply line 93 and a return line 94. The outward line 93 and the return line 94 run in a straight line along the row of painting booths 84-87, wherein the coating agent flows in the outward line 93 and in the return line 94 in each case in the direction of the arrows.

In each of the painting booths 84-87, the ring line 92 has a respective cable carrier outlet 95-98, to which application devices (e.g. rotary atomizers, spray guns) can be connected by means of a cable carrier in a conventional manner, as known for example from DE 39 27 880 A1.

The individual cable carrier outlets 95-98 are in this case arranged centrally with respect to the row of painting booths 84-87, so that the ring line 92 no longer has to be guided in a meandering fashion around the individual painting booths 84-87.

FIG. 14B shows an alternative line guidance of the ring line 92, wherein this example of embodiment largely corresponds to the example of embodiment described above and shown in FIG. 14A and therefore, in order to avoid repetitions, reference is largely made to the above description, the same references being used for corresponding details.

One particular feature of this example of embodiment is that the return line 94 of the ring line 92 is guided in a meandering fashion, wherein the return line 94 in each case forms a loop between the directly adjacent painting booths so that the return line 94 runs on one side of the row of painting booths 84-87.

Also in this example of embodiment, the outward line 93 of the ring line 92 runs in a straight line along the row of painting booths 84-87. However, the outward line 93 in this case runs behind the row of painting booths 84-87 in the transport direction, so that the cable carrier outlets 95-98 are also arranged laterally at the rear side of the painting booths 84-87, wherein the connection between the cable carrier outlets 95-98 and the outward line 93 takes place in each case through a stub line.

FIG. 14C shows a further example of embodiment of a possible line guidance of the ring line 92, wherein this example of embodiment partially corresponds to the examples of embodiments described above and shown in FIGS. 14A and 14B and therefore, in order to avoid repetitions, reference is largely made to the above description, the same references being used for corresponding details.

One particular feature of this example of embodiment is that the return line 94 of the ring line 92 is guided in a straight line along the row of painting booths 84-87, wherein the return line 94 is arranged in front of the row of painting booths 84-87 in the transport direction.

In this example of embodiment, the outward line 93 on the other hand is guided in a meandering fashion along the row of painting booths 84-87, wherein the individual cable carrier outlets 95-98 are in each case arranged to the side of and behind the painting booths 84-87 in the transport direction.

In the above-described examples of embodiments of various ring line arrangements, the ring line 92 may optionally be arranged in a plenum, a washing-out area, a booth support or in other elements of the painting booths 84-87. With the central arrangement of the ring line 92 as shown in FIG. 14A, the ring line 92 runs either above the painting area of the painting booth or below the painting area of the painting booth, so that the ring line 92 does not reduce the open cross section of the painting booth.

The invention is not limited to the preferred examples of embodiments described above. Rather, a large number of variants and modifications are possible which likewise make use of the inventive concept and therefore fall within the scope of protection.

Furthermore, the invention also claims protection for the different above-described variants independently of the superordinate concept of branching the transport path into a plurality of parallel branches.

List Of References:
1 motor vehicle bodies
2 transport path
3 transverse displacement section
4 rotary device
5-9 branches of the transport path
10 transverse displacement section
11 rotary device
12 transport path
13-17 painting booths
18-22 flash-off stations on the entrance side
23-27 flash-off stations on the exit side
28 reading station
29 transport path on the entrance side
30-33 branches
34 common transport path
35-37 parallel branches
38 common transport path
39 painting booth
40 motor vehicle body
41 transport path
42, 43 clear coat painting robot
44, 45 base coat painting robot
46, 47 doors
48 transport path
49, 50 flash-off station
51 painting station
52 powder supply device
53 powder recycling device
54-57 parallel branches
58-61 painting booths
62-65 flash-off stations
66 transverse displacement section
67-70 parallel branches
71-74 plasma furnace
75 spiral lift
76 branch of the transport path
77-79 processing stations
80 ring conveyor
81 rotary device
82, 83 plasma furnace
84-87 painting booths
88-91 branches
92 ring line
93 supply line
94 return line
95-98 energy chain outlet
A, B motor vehicle bodies
H handling robot
R painting robot

The invention claimed is:

1. A coating installation, comprising:
a transport path, along which a plurality of coating objects are transported in a transport direction through the coating installation, the transport path including one or more common portions and a plurality of branch portions that are parallel branches, the coating installation being configured such that the one or more common portions are used to transport all of the coating objects, and each of the branch portions is used to transport some, but less than all, of the coating objects, and
a plurality of treatment stations, including a plurality of drying stations, in which the plurality of coating objects are treated,
wherein each drying station is arranged in a branch portion such that no common portion includes a drying station, further wherein
between two adjacent branches of the transport path, there is at least one robot which operates the treatment stations in the two adjacent branches, and further wherein
the transport path is configured to permit bidirectional transport of the plurality of coating objects at least in the parallel branches.

2. A coating installation according to claim 1, wherein a different number of treatment stations are arranged in the parallel branches.

3. A coating installation according to claim 1, wherein the following treatment stations are arranged one behind the other in the transport direction in the individual branches of the transport path:
   a) at the entry side a first flash-off station, in which at least one of the plurality of coating objects flashes off after the application of a coating agent,
   b) at the exit side a second flash-off station, in which at least one of the plurality of coating objects flashes off after the application of a coating agent,
   c) between the two flash-off stations a coating station, in which a coating agent is applied to one of the plurality of coating objects.

4. A coating installation according to claim 1, wherein the transport path transports different coating objects at different transport speeds.

5. A coating installation according to claim 1, wherein a wet coat coating station is arranged in one branch of the transport path and a powder coat coating station is arranged in another branch of the transport path.

6. A coating installation according to claim 1, wherein
   a) a monochromatic coating station, which applies only coating agents of the most frequently desired color without any color change, is arranged in at least one branch of the transport path, and
   b) a multichromatic coating station, which applies coating agents of different colors, is arranged in another branch of the transport path.

7. A coating installation according to claim 1, wherein two clear coat painting robots and two base coat painting robots are arranged in a coating station, all of which robots can also be used as handling robots.

8. A coating installation according to claim 1, wherein
   a) individual treatment stations of said plurality of treatment stations form standardized modules;
   b) said individual treatment stations have uniform external dimensions, and
   c) said individual treatment stations have uniform connections for compressed air, coating agents, rinsing agents, supplied air, extracted air, control signals, measurement signals and power supply.

9. A coating installation according to claim 1, wherein the individual branches of the transport path branch off radially from a central branching point, wherein the plurality of coating objects are supplied or removed via the branching point.

10. A coating installation according to claim 8, wherein a spiral lift, which supplies the coating objects via a lifting movement, is arranged at the central branching point of the transport path.

11. A coating installation according to claim 1, comprising a ring line which supplies individual treatment stations of said plurality of treatment stations with a coating agent, wherein the treatment stations are arranged in a row.

12. A coating installation according to claim 10, wherein
   a) the ring line has a supply line and a return line,
   b) the supply line runs in a substantially straight line along the row of treatment stations, and
   c) the return line runs in a substantially straight line along the row of treatment stations.

13. A coating installation according to claim 10, wherein
   a) the ring line in the individual treatment stations in each case has an energy guiding chain outlet, to which an energy guiding chain can be connected for supply purposes, in order to supply devices in the individual treatment stations with the coating agent, and
   b) the energy guiding chain outlet is arranged centrally in the individual treatment stations, namely relative to the row of treatment stations and relative to the individual treatment stations.

14. A coating installation according to claim 10, wherein
   a) the supply line of the ring line runs in a meandering fashion along the row of treatment stations and around the individual treatment stations, and
   b) the return line of the ring line runs in a substantially straight line along the row of treatment stations.

\* \* \* \* \*

UNITED STATES PATENT AND TRADEMARK OFFICE
CERTIFICATE OF CORRECTION

| | | |
|---|---|---|
| PATENT NO. | : 8,794,174 B2 | Page 1 of 1 |
| APPLICATION NO. | : 12/064122 | |
| DATED | : August 5, 2014 | |
| INVENTOR(S) | : Herre et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1369 days.

Signed and Sealed this
Twenty-ninth Day of December, 2015

Michelle K. Lee
*Director of the United States Patent and Trademark Office*